United States Patent
Hu et al.

(10) Patent No.: US 10,909,675 B2
(45) Date of Patent: Feb. 2, 2021

(54) SYSTEM AND METHOD FOR TISSUE CHARACTERIZATION BASED ON TEXTURE INFORMATION USING MULTI-PARAMETRIC MRI

(71) Applicants: MAYO Foundation for Medical Education and Research, Scottsdale, AZ (US); Arizona Board of Regents on Behalf of Arizona State University, Scottsdale, AZ (US)

(72) Inventors: Leland S. Hu, Scottsdale, AZ (US); J. Ross Mitchell, Scottsdale, AZ (US); Jing Li, Tempe, AZ (US); Teresa Wu, Gilbert, AZ (US)

(73) Assignees: Mayo Foundation for Medical Education and Research, Rochester, MN (US); Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/290,963

(22) Filed: Oct. 11, 2016

(65) Prior Publication Data
US 2017/0103525 A1 Apr. 13, 2017

Related U.S. Application Data

(60) Provisional application No. 62/351,129, filed on Jun. 16, 2016, provisional application No. 62/239,642, filed on Oct. 9, 2015.

(51) Int. Cl.
| G06T 7/00 | (2017.01) |
| G06T 7/41 | (2017.01) |
| G06T 7/11 | (2017.01) |

(52) U.S. Cl.
CPC ............. *G06T 7/0012* (2013.01); *G06T 7/11* (2017.01); *G06T 7/41* (2017.01); *G06T 2207/10088* (2013.01)

(58) Field of Classification Search
CPC ......... G06T 2207/10088; G06T 7/0012; G06T 7/0081; G06T 7/40
See application file for complete search history.

(56) References Cited

U.S. PATENT DOCUMENTS

| 8,908,948 B2 | 12/2014 | Fan | |
| 2010/0329529 A1* | 12/2010 | Feldman | G06K 9/4619 |
| | | | 382/131 |

(Continued)

OTHER PUBLICATIONS

Herlidou-Meme, S., et al. "MRI texture analysis on texture test objects, normal brain and intracranial tumors." Magnetic resonance imaging 21.9 (2003): 989-993.*

(Continued)

*Primary Examiner* — Nirav G Patel
(74) *Attorney, Agent, or Firm* — Quarles & Brady LLP

(57) ABSTRACT

A system and method for characterizing tissues of a subject using multi-parametric imaging are provided. In some aspects, the method includes receiving a set of multi-parametric magnetic resonance ("MR") images acquired from a subject using an MR imaging system, and selecting at least one region of interest ("ROI") in the subject using one or more images in the set of multi-parametric MR images. The method also includes performing a texture analysis on corresponding ROIs in the set of multi-parametric MR images to generate a set of texture features, and applying a classification scheme, using the set of texture features, to characterize tissues in the ROI. The method further includes generating a report indicative of characterized tissues in the ROI.

21 Claims, 7 Drawing Sheets

(Continued)

(6 of 7 Drawing Sheet(s) Filed in Color)

(56) References Cited

U.S. PATENT DOCUMENTS

| | | |
|---|---|---|
| 2012/0093381 A1 | 4/2012 | Fan |
| 2016/0098621 A1* | 4/2016 | Tahmasebi Maraghoosh ............. A61B 8/085 600/411 |
| 2016/0203599 A1* | 7/2016 | Gillies .................... A61B 6/463 382/132 |
| 2017/0053090 A1* | 2/2017 | Viswanath .......... G06F 19/3437 |

OTHER PUBLICATIONS

Sachdeva, Jainy, et al. "Segmentation, feature extraction, and multiclass brain tumor classification." Journal of digital imaging 26.6 (2013): 1141-1150.*

Zhan, Yiqiang, and Dinggang Shen. "Design efficient support vector machine for fast classification." Pattern Recognition 38.1 (2005): 157-161.*

O'Connor, James PB, et al. "Imaging intratumor heterogeneity: role in therapy response, resistance, and clinical outcome." Clinical Cancer Research 21.2 (2015): 249-257.*

Zacharaki, Evangelia I., et al. "Classification of brain tumor type and grade using MRI texture and shape in a machine learning scheme." Magnetic Resonance in Medicine: An Official Journal of the International Society for Magnetic Resonance in Medicine 62.6 (2009): 1609-1618. (Year: 2009).*

Mahapatra, Dwarikanath, et al. "Localizing and segmenting Crohn's disease affected regions in abdominal MRI using novel context features." Medical Imaging 2013: Image Processing. vol. 8669. International Society for Optics and Photonics, 2013. (Year: 2013).*

Scott, J. N., et al. "How often are nonenhancing supratentorial gliomas malignant? A population study." Neurology 59.6 (2002): 947-949.

Semmineh NB, et al. Assessing tumor cytoarchitecture using multiecho DSC-MRI derived measures of the transverse relaxivity at tracer equilibrium (TRATE). Magn Reson Med. 2015;74 (3):772-784.

Shapiro JR, et al. Isolation, karyotype, and clonal growth of heterogeneous subpopulations of human malignant gliomas. Cancer Res. 1981;41:2349-2359.

Snuderl, M, et al. "Mosaic amplification of multiple receptor tyrosine kinase genes in glioblastoma." Cancer cell 20.6 (2011): 810-817.

Sottoriva A, et al. Intratumor heterogeneity in human glioblastoma reflects cancer evolutionary dynamics. Proc Natl Acad Sci USA. 2013;110 (10):4009-4014.

Stadlbauer A, et al. Gliomas: histopathologic evaluation of changes in directionality and magnitude of water liffusion at diffusion-tensor MR imaging. Radiology. 2006;240 (3):803-810.

Tykocinski ES, et al. Use of magnetic perfusion-weighted imaging to determine epidermal growth factor receptor variant III expression in glioblastoma. Neuro Oncol. 2012;14 (5):613-623.

Urish KL, et al. Registration of magnetic resonance image series for knee articular cartilage analysis: data from the osteoarthritis initiative. Cartilage. 2013;4 (1):20-27.

Valdes PA, et al. Gadolinium- and 5-aminolevulinic acid-induced protoporphyrin IX levels in human gliomas: an ex vivo quantitative study to correlate protoporphyrin IX levels and blood-brain barrier breakdown. J Neuropathol Exp Neurol. Sep. 2012;71(9):806-13.

Van Den Bent, M. J., et al. "Adjuvant procarbazine, lomustine, and vincristine chemotherapy in newly diagnosed anaplastic oligodendroglioma: long-term follow-up of EORTC brain tumor group study 26951." Journal of clinical oncology 31.3 (2013): 344-350.

Van Meter T, et al. Microarray analysis of MRI-defined tissue samples in glioblastoma reveals differences in regional expression of therapeutic targets. Diagn Mol Pathol. 2006;15 (4):195-205.

Weber MA, et al. Biopsy targeting gliomas: do functional imaging techniques identify similar target areas? Invest Radiol. Dec. 2010;45(12):755-68.

Yang D, et al. Evaluation of tumor-derived MRI-texture features for discrimination of molecular subtypes and prediction of 12-month survival status in glioblastoma. Med Phys. 2015;42 (11):6725-6735.

Yeung TP, et al. Improving quantitative CT perfusion parameter measurements using principal component analysis. Acad Radiol. May 2014;21(5):624-32.

Agarwal S, et al. Delivery of molecularly targeted therapy to malignant glioma, a disease of the whole brain. Expert Rev Mol Med. May 13, 2011;13:e17. Review.

Aghi M, et al. Magnetic resonance imaging characteristics predict epidermal growth factor receptor amplification status in glioblastoma. Clin Cancer Res. 2005;11 (24Pt1):8600-8605.

Barajas RF Jr, et al. Glioblastoma multiforme regional genetic and cellular expression patterns: influence on anatomic and physiologic MR imaging. Radiology. 2010;254 (2):564-576.

Barajas RF Jr, et al. Regional variation in histopathologic features of tumor specimens from treatment-naive glioblastoma correlates with anatomic and physiologic MR Imaging. Neuro Oncol. 2012;14 (7):942-954.

Benjamini Y, et al. Controlling the false discovery rate: a practical and powerful approach to multiple testing. J R Statist Soc B. 1995;57:289-300.

Berens ME, et al. " . . . those left behind." Biology and oncology of invasive glioma cells. Neoplasia. Aug. 1999;1 (3):208-19. Review.

Bonavia R, et al. Heterogeneity maintenance in glioblastoma: a social network. Cancer Res. 2011;71 (12):4055-4060.

Borad MJ, et al. Integrated genomic characterization reveals novel, therapeutically relevant drug targets in FGFR and EGFR pathways in sporadic intrahepatic cholangiocarcinoma. PLoS Genet. 2014;10 (2):e1004135.

Brennan CW, et al. The somatic genomic landscape of glioblastoma. Cell. 2013;155 (2):462-477.

Brown, R, et al. "The use of magnetic resonance imaging to noninvasively detect genetic signatures in oligodendroglioma." Clinical Cancer Research 14.8 (2008): 2357-2362.

Cairncross, G, et al. "Phase III trial of chemoradiotherapy for anaplastic oligodendroglioma: long-term results of RTOG 9402." Journal of clinical oncology 31.3 (2013): 337.

Cancer Genome Atlas Research Network. Comprehensive genomic characterization defines human glioblastoma genes and core pathways. Nature. Oct. 23, 2008;455(7216):1061-8.

Cha, S, et al. "Intracranial mass lesions: dynamic contrast-enhanced susceptibility-weighted echo-planar perfusion MR imaging." Radiology 223.1 (2002): 11-29.

Coons SW, et al. Regional heterogeneity in the DNA content of human gliomas. Cancer. 1993;72 (10):3052-3060.

Craig DW, et al. Genome and transcriptome sequencing in prospective metastatic triple-negative breast cancer uncovers therapeutic vulnerabilities. Mol Cancer Ther. 2013;12 (1):104-116.

Dixon SJ, et al. Comparison of performance of five common classifiers represented as boundary methods: Euclidean distance to centroids, linear discriminant analysis, quadratic discriminant analysis, learning vector quantization and support vector machines, as dependent on data structure. Chemometrics and Intelligent Laboratory Systems. 2009; 95(1), 1-17.

Drabycz S, et al. An analysis of image texture, tumor location, and MGMT promoter methylation in glioblastoma using magnetic resonance imaging. Neuroimage. Jan. 15, 2010;49(2):1398-405.

Ellingson BM, et al. Validation of functional diffusion maps (fDMs) as a biomarker for human glioma cellularity. J Magn Reson Imaging. Mar. 2010;31(3):538-48.

Ene C, et al. Many tumors in one: a daunting therapeutic prospect. Cancer Cell. 2011;20 (6):695-697.

Eyal E, et al. Principal component analysis of dynamic contrast enhanced MRI in human prostate cancer. Invest Radiol. Apr. 2010;45(4):174-81.

Gatenby RA, et al. Adaptive therapy. Cancer Res. 2009;69:4894-4903.

(56) References Cited

OTHER PUBLICATIONS

Ginsberg, L. E., et al. "The significance of lack of MR contrast enhancement of supratentorial brain tumors in adults: histopathological evaluation of a series." Surgical neurology 49.4 (1998): 436-440.

Gönen M, et al. Statistical issues in analysis of diagnostic imaging experiments with multiple observations per patient. Radiology. Dec. 2001;221(3):763-7. PubMed PMID: 11719674.

Gupta A, et al. Pretreatment Dynamic Susceptibility Contrast MRI Perfusion in Glioblastoma: Prediction of EGFR Gene Amplification. Clin Neuroradiol. 2015;25 (2):143-150.

Gutman DA, et al. MR imaging predictors of molecular profile and survival: multi-institutional study of the TCGA glioblastoma data set. Radiology. 2013;267 (2):560.

Haralick RM, et al. Textural features for image classification. Systems, Man and Cybernetics, IEEE Transactions on 6 (1973): 610-621.

Hu LS, et al. Correlations between perfusion MR imaging cerebral blood volume, microvessel quantification, and clinical outcome using stereotactic analysis in recurrent high-grade glioma. AJNR Am J Neuroradiol. 2012;33 (1):69-76.

Hu LS, et al. Multi-parametric MRI and Texture analysis to visualize spatial histologic heterogeneity and tumor extent in glioblastoma. PLoS One. 2015;10 (11):e0141506.

Hu LS, et al. Reevaluating the imaging definition of tumor progression: perfusion MRI quantifies recurrent glioblastoma tumor fraction, pseudoprogression, and radiation necrosis to predict survival. Neuro Oncol. 2012;14 (7):919-930.

Hu LS, et al. Relative cerebral blood volume values to differentiate high-grade glioma recurrence from posttreatment radiation effect: direct correlation between image-guided tissue histopathology and localized dynamic susceptibility-weighted contrast-enhanced perfusion MR imaging measurements. AJNR Am J Neuroradiol. Mar. 2009;30(3):552-8. PMID: 19056837.

Hu LS. Advanced MRI and Texture Analysis in Gliomas: Clinical Perspective. Presentation at MICCAI 2015. Oct. 5, 2015. Munich, Germany.

Itakura H, et al. Magnetic resonance image features identify glioblastoma phenotypic subtypes with distinct molecular pathway activities. Sci Transl Med .2015;7 (303):303ra138.

Jain R, et al. Outcome prediction in patients with glioblastoma by using imaging, clinical, and genomic biomarkers: focus on the nonenhancing component of the tumor. Radiology. 2014;272 (2):484-493.

Knopp, E. A., et al. "Glial neoplasms: dynamic contrast-enhanced T2*-weighted MR imaging." Radiology 211.3 (1999): 791-798.

Laviolette PS, et al. Precise ex vivo histological validation of heightened cellularity and diffusion-restricted necrosis in regions of dark apparent diffusion coefficient in 7 cases of high-grade glioma. Neuro Oncol. Dec. 2014;16 (12):1599-606.

Law, M., et al. "Glioma grading: sensitivity, specificity, and predictive values of perfusion MR imaging and proton MR spectroscopic imaging compared with conventional MR imaging." American Journal of Neuroradiology 24.10 (2003): 1989-1998.

Lin GC, et al. Automated classification of multi-spectral MR images using Linear Discriminant Analysis. Comput Med Imaging Graph. Jun. 2010;34(4):251-68.

Lipson D, et al. Efficient calculation of interval scores for DNA copy number data analysis. J Comput Biol. 2006;13 (2):215-228.

Maia, ACM, et al. "Stereotactic biopsy guidance in adults with supratentorial nonenhancing gliomas: role of perfusion-weighted magnetic resonance imaging." Journal of neurosurgery 101.6 (2004): 970-976.

Marko, N. F., et al. "Extent of resection of glioblastoma revisited: personalized survival modeling facilitates more accurate survival prediction and supports a maximum-safe-resection approach to surgery." Journal of clinical oncology 32.8 (2014): 774.

Marusyk A, et al. Intra-tumour heterogeneity: a looking glass for cancer? Nat Rev Cancer. 2012;12 (5):323-334.

Megyesi, J. F., et al. "Imaging correlates of molecular signatures in oligodendrogliomas." Clinical Cancer Research 10.13 (2004): 4303-4306.

Muragaki, Y., et al. "Low-grade glioma on stereotactic biopsy: how often is the diagnosis accurate?." Min-minimally invasive Neurosurgery 51.05 (2008): 275-279.

Ojala T, et al. Multiresolution gray-scale and rotation invariant texture classification with local binary patterns. Pattern Analysis and Machine Intelligence, IEEE Transactions on 24.7 (2002): 971-987.

Pafundi DH, et al. Biopsy validation of 18F-DOPA PET and biodistribution in gliomas for neurosurgical planning and radiotherapy target delineation: results of a prospective pilot study. Neuro Oncol. Aug. 2013;15(8):1058-67.

Pope WB, et al. Relationship between gene expression and enhancement in glioblastoma multiforme: exploratory DNA microarray analysis. Radiology. 2008;249 (1):268-277.

Price SJ, et al. Improved delineation of glioma margins and regions of infiltration with the use of diffusion tensor imaging: an image-guided biopsy study. AJNR Am J Neuroradiol. 2006;27 (9):1969-1974.

Roberts DW, et al. Coregistered fluorescence-enhanced tumor resection of malignant glioma: relationships between d-aminolevulinic acid-induced protoporphyrin IX fluorescence, magnetic resonance imaging enhancement, and neuropathological parameters. Clinical article. J Neurosurg. Mar. 2011;114(3):595-603.

Ryoo I, et al. Cerebral blood volume calculated by dynamic susceptibility contrast-enhanced perfusion MR imaging: preliminary correlation study with glioblastoma genetic profiles. PLoS One. 2013;8 (8):e71704.

Sanai N, et al. An extent of resection threshold for newly diagnosed glioblastomas. J Neurosurg. Jul. 2011;115(1):3-8.

\* cited by examiner

SYSTEM AND METHOD FOR TISSUE CHARACTERIZATION BASED ON TEXTURE INFORMATION USING MULTI-PARAMETRIC MRI

CROSS-REFERENCE TO RELATED APPLICATIONS

This application claims the benefit of, is based on, and incorporates herein by reference in its entirety U.S. Provisional Patent Application Ser. No. 62/239,642 filed on Oct. 9, 2015 and entitled "Method and System for Tumor Identification in Multi-parametric MRI using texture information," and U.S. Provisional Patent Application Ser. No. 62/351,129 filed on Jun. 16, 2016 and entitled "Radiogenomics to Characterize Regional genetic Heterogeneity in Glioblastoma."

STATEMENT REGARDING FEDERALLY SPONSORED RESEARCH

This invention was made with government support under NS082609 awarded by the National Institutes of Health. The government has certain rights in the invention.

BACKGROUND OF THE INVENTION

The field of the invention is directed to medical imaging. More particularly, the present disclosure is directed to using multi-parametric magnetic resonance imaging ("MRI") to characterize tumors and other tissues targeted in a subject's body.

Glioblastoma ("GBM") represents one of the most genetically heterogeneous, resistant, and lethal of all human cancers. While median survival remains poor with conventional therapy, the use of genomic profiling has ushered promising new approaches to drug discovery and treatment optimization. Recently, uncovering GBM's genetic landscape has given insight to pathogenesis, prognosis and therapeutic susceptibility, which may guide risk stratification for existing protocols and help identify key driver genes as potential therapeutic targets. With improving availability and cost, genomic profiling may likely play an ever-increasing role in the paradigm of individualized oncology.

However, securing tumor-rich biological specimens for genomic profiling remains a significant challenge. It has been reported that only 35% of submitted biopsy samples contained adequate tumor content and/or genetic material. This low yield may relate to GBM's intense histological heterogeneity and the limitations of contrast-enhanced MRI ("CE-MRI")-guided biopsies to distinguish enhancing tumor from non-tumor tissue, such as reactive gliosis, microscopic necrosis, and so forth. In addition, CE-MRI is also poor at localizing tumor within surrounding non-enhancing parenchyma, or Brain Around Tumor ("BAT"), which appears indistinguishable from non-tumor vasogenic edema. Furthermore, recently proposed multisampling approaches, which help characterize intra-tumoral heterogeneity, can also increase the risk acquiring during a biopsy procedure tissue with low tumor content because biopsy volumes are typically smaller than en bloc resection.

Advanced MRI can offer an adjunct to conventional imaging, capable of helping to identify tumor-rich biopsy tissues and other targets. For instance, tumor cell density on diffusion-weighted imaging ("DWI"), white matter infiltration on diffusion tensor imaging ("DTI"), and microvessel morphology on perfusion MRI ("pMRI") may help identify some of the key biophysical characteristics associated with tumor pathogenesis. Additionally, patterns between spatially encoded voxels and their surrounding neighbors can provide further insight into regional microstructure and histological identity.

In general, many of the above-mentioned imaging techniques have been utilized independently to delineate tumor-rich and other tissue targets, with each technique providing limited or incomplete information. Although some studies have suggested benefits from qualitatively combining various imaging types, to date there is no system that integrates diverse image-based phenotypes in a quantitative manner to enable accurate biopsy target identification and quantification of tumor content.

Therefore, given the above, there is a need for improved systems and methods for identifying various tissues in a subject using various MRI images. For instance, in some applications, it may be desirable to develop non-invasive correlates of histology that can facilitate image-guided biopsies and genomic profiling within the framework of personalized oncology treatment.

SUMMARY OF THE INVENTION

The present invention overcomes the aforementioned drawbacks by providing a novel image analysis approach that relies on texture information obtained from multi-parametric magnetic resonance imaging ("MR") to characterize and visualize various regions of interest in a subject. Using the system and method disclosed herein, different tissues in a subject may be more accurately distinguished compared to previous technologies, such as normal and abnormal tissue, or tissues with different tumor grades, types, genetic drivers, and so on. As will be described, the present approach may facilitate the detection of potential biopsy locations, resection targets, as well as allow for adapted treatment approaches.

In accordance with one aspect of the disclosure, a computer-implemented method for characterizing tissues of a subject using multi-parametric imaging is provided. The method includes receiving a set of multi-parametric magnetic resonance ("MR") images acquired from a subject using an MR imaging system, and selecting at least one region of interest ("ROI") in the subject using one or more images in the set of multi-parametric MR images. The method also includes performing a texture analysis on corresponding ROIs in the set of multi-parametric MR images to generate a set of texture features, and applying a classification scheme, using the set of texture features, to characterize tissues in the ROI. The method further includes generating a report indicative of characterized tissues in the ROI.

In accordance with another aspect of the disclosure, a system for characterizing tissues of a subject using multi-parametric imaging is provided. The system includes an input configured to receive a set of multi-parametric magnetic resonance ("MR") images, and a processor programmed to select at least one region of interest ("ROI") in the subject using one or more images in the set of multi-parametric MR images, and perform a texture analysis on corresponding ROIs in the set of multi-parametric MR images to generate a set of texture features. The processor is also programmed to apply a classification scheme, using the set of texture features, to characterize tissues in the ROI, and generate a report indicative of characterized tissues in the ROI. The system also includes an output for displaying the report.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The present invention will hereafter be described with reference to the accompanying drawings, wherein like reference numerals denote like elements. The patent or application file contains at least one drawing executed in color. Copies of this patent or patent application publication with color drawing(s) will be provided by the Office upon request and payment of the necessary fee.

DETAILED DESCRIPTION OF THE INVENTION

The present disclosure overcomes the drawbacks of previous technologies by introducing a novel image analysis for characterizing tissues of a subject. Using multi-parametric magnetic resonance ("MR") images, the herein provided system and method apply a texture analysis to generate various texture information that can be used in a classification scheme to differentiate various tissue types. This approach enables co-localization and incorporation of complementary information, providing more accurate tissue characterization for optimized diagnostic interpretation and treatment.

In recognizing that different texture algorithms and different MR images can provide different or complementary information about imaged tissues, in some aspects of the present disclosure, a combination of texture algorithms applied to multi-parametric magnetic resonance ("MR") images may be utilized. Extracted texture features may then be combined, for example, using a machine learning technique, and used in a classification scheme to characterize tissues in a subject.

Using the present approach, abnormal tissues may be more readily and accurately distinguished from normal tissues. In one example, as will be described, histological tumor content of subjects suffering from Glioblastoma ("GBM") may be generated and visualized, to better inform biopsy or resection procedures. In another example, inverted papilloma ("IP") tissue maybe distinguished from squamous cell carcinoma ("SCCA") tissue. In yet another example, genetic heterogeneity may be determined based on characterized tissues, to inform a radiation treatment, for instance. However, the present approach is not limited to these applications, and may indeed have a variety of applications, as appreciated by one of ordinary skill in the art.

Figure 1:
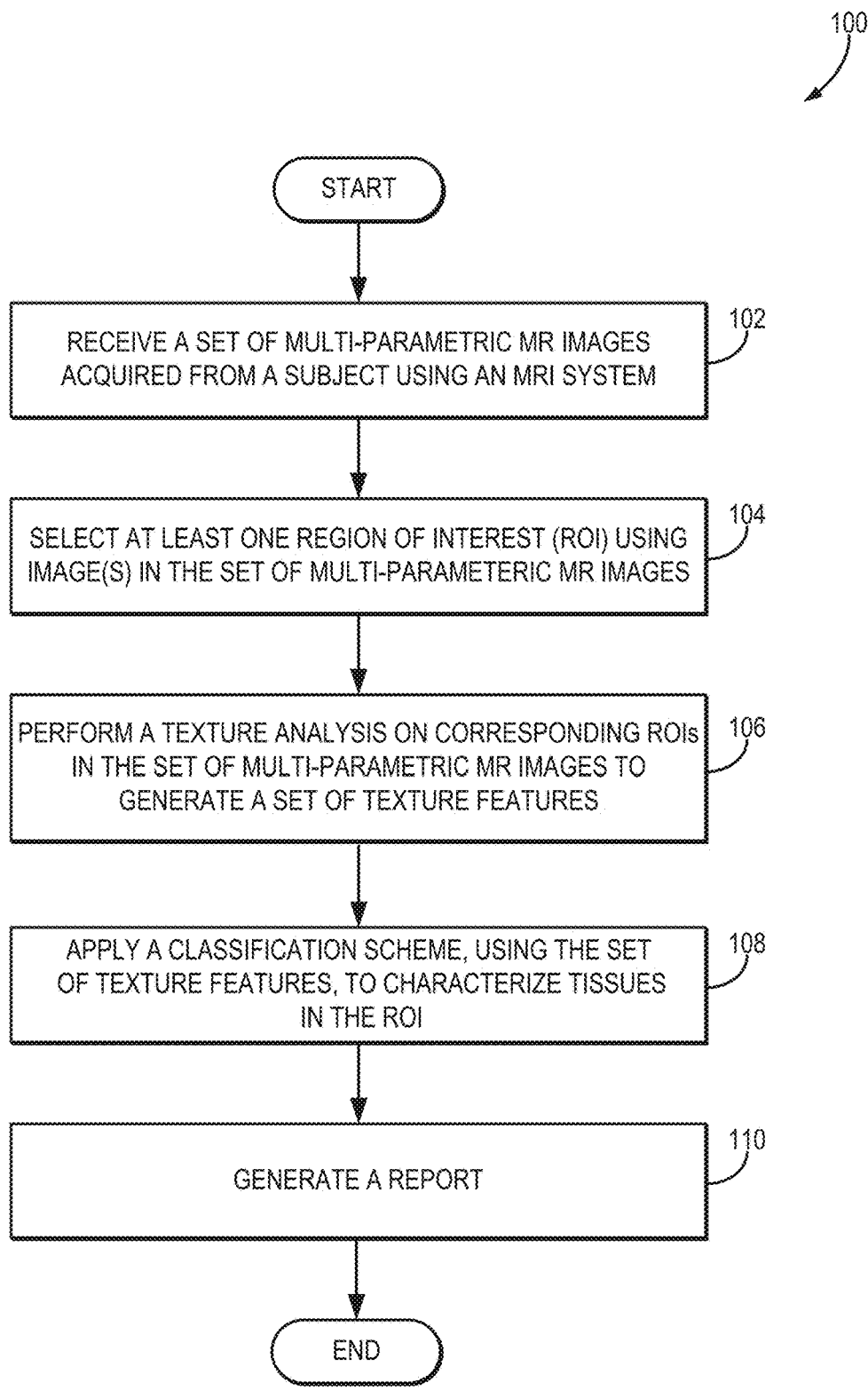
FIG. 1 is a flowchart setting forth steps of a process, in accordance with aspects of the present disclosure.

Turning to FIG. 1, a flowchart setting forth steps of a process 100 in accordance with aspects of the present disclosure. The process 100 may begin at process block 102 with receiving a set of multi-parametric MR images acquired from the subject using an MR imaging system. By way of example, the set of multi-parametric MR images may include T1-Weighted ("T1W") images, T2-Weighted ("T2W") images, diffusion tensor images ("DTI"), perfusion MR images, dynamic susceptibility-weighted contrast-enhanced ("DSC") perfusion MR images, and other image types. The set of multi-parametric MR images may be accessed from a database, server, or other data storage location, as well as from an imaging system. In some aspects, multi-parametric MR image data may be acquired at process block 102 using the MR imaging system, or other imaging system. As such, multi-parametric MR images may be reconstructed at process block 102 using the acquired image data. In addition, a number of maps may be generated. For example, acquired DTI data may be used to generate different parametric maps including isotropic diffusion maps, anisotropic diffusion maps, mean diffusivity ("MD") maps, fractional anisotropy ("FA"), each of which produces an individual image to be added to the total set of multi-parametric MR images. In some aspects, multi-parametric MR images from multiple subjects may be received at process block 102.

Images or maps, received or reconstructed at process block 102, may also be subjected to a number of preprocessing steps. For instance, any number of steps may be carried out to compensate for motion errors, field bias errors, distortion errors, and so forth. In some aspects, some, or all, images or maps may be registered using an appropriate image registration algorithm, such as rigid registration. In addition, an intensity standardization may also be performed at process block 102 in order to reduce intensity non-uniformity effects in the texture and other information generated therefrom. Hence, in some aspects, images, or regions of interest ("ROIs") in the set of multi-parametric MR images may be normalized such that intensities extend over a predetermined dynamic range. For example, intensity values may be mapped onto a range between 0 and 255, although other values may be possible.

The process 100 may then continue by selection one or more ROIs in to the set of multi-parametric MR, as indicated by process block 104. In one non-limiting example, the ROIs may correspond to particular regions or tissue structures in the brain. In some aspects, the ROIs may be manually selected by a user by specifying specific ROI coordinates, or using a mouse, or other input device, to highlight various regions, for example. Alternatively, or additionally, an automated segmentation technique may also be utilized to identify and select the ROIs.

The selected or identified ROIs may then be analyzed. In some aspects, the ROIs may be analyzed by performing a texture analysis on corresponding ROIs in the set of multi-parametric MR images, as indicated by process block 106. In the texture analysis, various texture information may be generated using various texture algorithms. For instance, texture information may be in the form various texture features, which are mathematical parameters computed using image pixel intensities. Example texture algorithms include a Gray Level Co-Occurrence Matrix ("GLCM") algorithm, a Local Binary Patterns ("LBP") algorithm, or a Discrete Orthonormal Stockwell Transform ("DOST"). Other algorithms may also be possible. Texture features may also include various images or other signatures.

Texture features generally capture different aspects of the spatial distribution of intensities to provide a quantitative indication of image texture. In some aspects, texture features may include first-order and second order texture features. Examples of first-order texture features include the mean, standard deviation, skewness and kurtosis. Example second-order texture features include entropy, angular second moment, dissimilarity, homogeneity, inertia, correlation and energy.

In some aspects, a number of texture algorithms may be applied to generate the texture information. Advantageously, texture features produced using multiple texture algorithms can be combined to provide complementary information, for enhanced tissue characterization and discrimination. In some aspects, the dimensionality of texture features generated using a texture algorithm may be reduced using a Principle Component Analysis ("PCA"). This procedure finds a linear combinations of features, called Principal Components ("PCs"), that captures data variability and strong patterns.

Then at process block 108, a classification scheme may be applied, using the generated texture features, to characterize tissues in the ROIs. In particular, tissue types may be identified by performing a comparison using a model, data, or other information stored in a memory, database, or other storage location. In some aspects, in the classification scheme, pixels or voxels associated with the selected or identified ROIs may be assigned indices or values corresponding to a likely tissue type. In some aspects, a machine learning technique may also be performed at process block 106, to generate a classification model. Also, the classification model may be generated using a sequential forward feature selection process identifying a subset of image-based PCs with the greatest combined discrimination for biopsy tumor content, for example, or other tissue types. By way of example, a Diagonal Linear Discriminate Analysis ("DLDA"), a Diagonal Quadratic Discriminate Analysis ("DQDA"), or a Support Vector Machines ("SVM") algorithm may be utilized to generate the model. In some aspects, the model may be optimized to identify tissues with high and/or low tumor content, or specific genetic profiles.

In one aspect, various biopsy locations may be determined at process block 108 based on characterized tissues in the ROIs. In another aspect, a genetic heterogeneity in the ROI may be determined at process block 108 based on characterized tissues in the ROIs. In yet another aspect, a treatment may be adapted based on characterized tissues in the ROIs.

Then, at process block 110 a report indicative of characterized tissues in the ROI may be generated. The report may be in any form and provide various information. In some aspects, the report may include images or maps indicating various normal, and/or abnormal tissue or structures in the subject, such as brain and other tissues or structures. The report may also include indicate regions or locations of high and/or low tumor content, or with specific genetic profiles. The report may also provide quantitative information regarding tissue characteristics and distribution. In addition, report may include one or more of the overlaid multi-parametric MR images. As described, the report may further indicate locations for biopsies, or a genetic heterogeneity.

Figure 2:
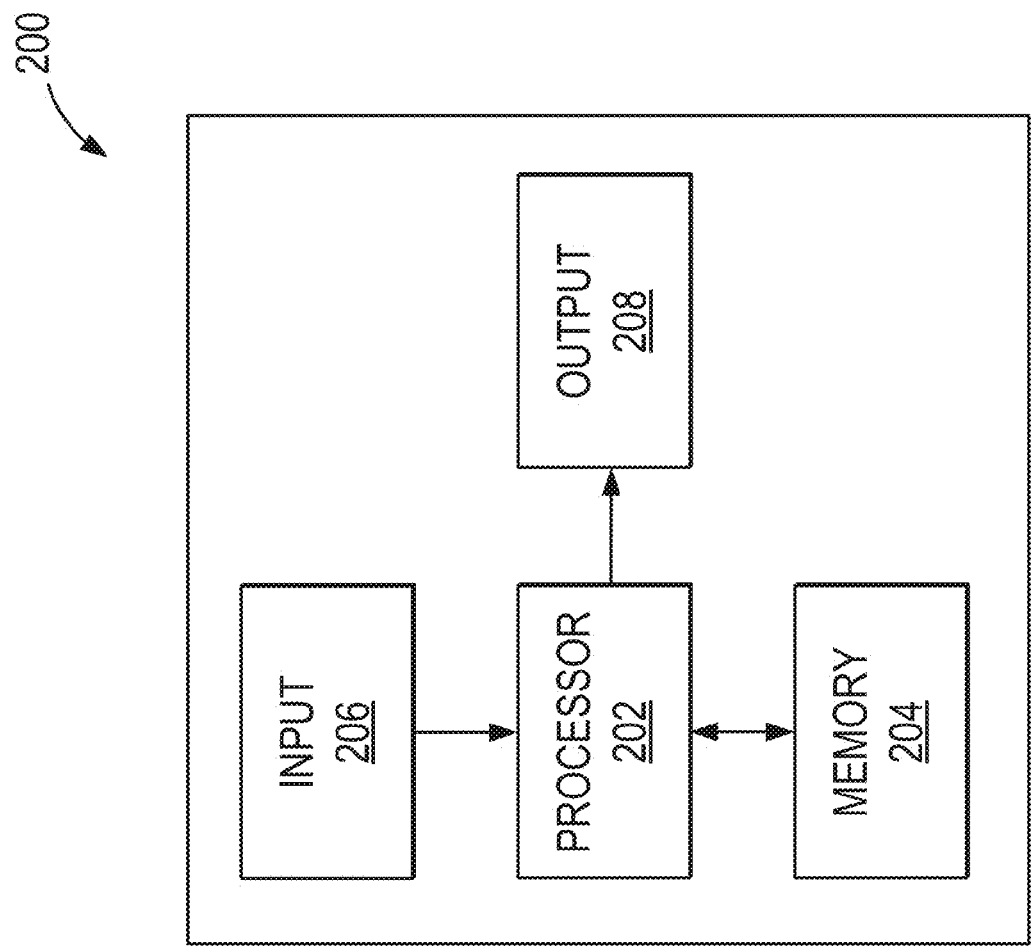
FIG. 2 is a schematic diagram of an example system, in accordance with aspects of the present disclosure.
Figure 2:
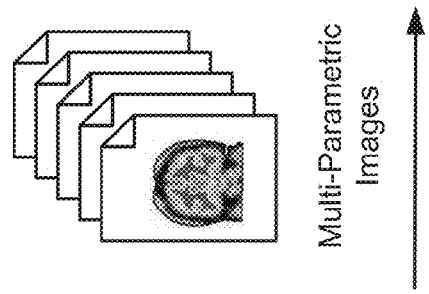
Figure 2:
Figure 3A:
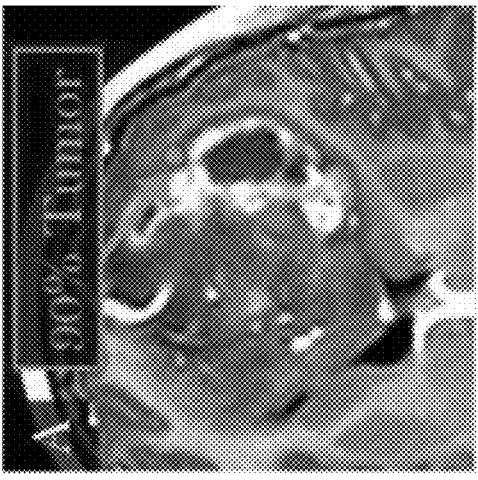
FIG. 3A is an image illustrating an example tumor-rich region in a subject's brain, characterized in accordance with aspects of the present disclosure.
Figure 3B:
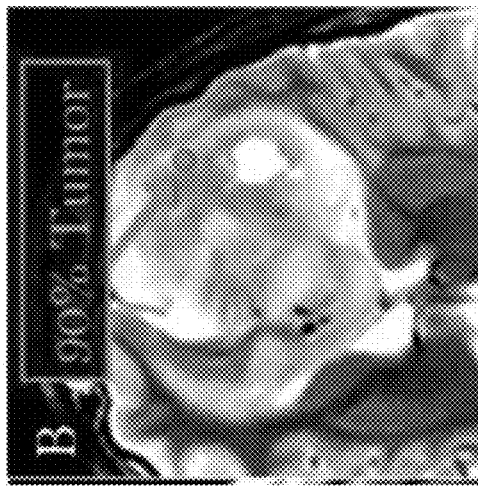
FIG. 3B is an image illustrating another example tumor-rich region in a subject's brain, characterized in accordance with aspects of the present disclosure.
Figure 3C:
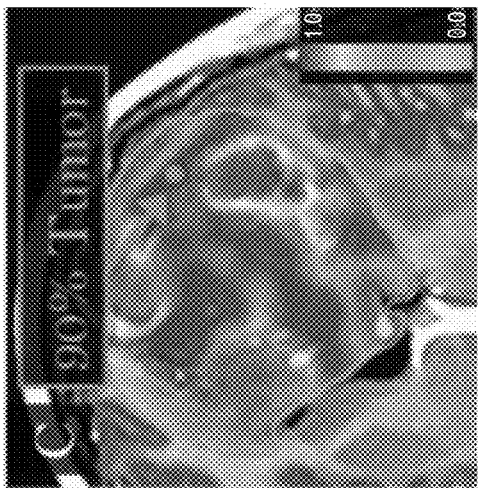
FIG. 3C is an image illustrating yet another example tumor-rich region in a subject's brain, characterized in accordance with aspects of the present disclosure.
Figure 3D:
FIG. 3D is an image illustrating yet another example tumor-rich region in a subject's brain, characterized in accordance with aspects of the present disclosure.
Figure 3E:
FIG. 3E is an image illustrating yet another example tumor-rich region in a subject's brain, characterized in accordance with aspects of the present disclosure.
Figure 3F:
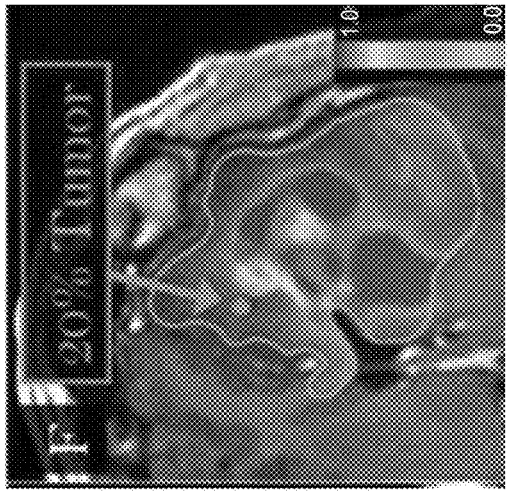
FIG. 3F is an image illustrating yet another example tumor-rich region in a subject's brain, characterized in accordance with aspects of the present disclosure.

Turning now to FIG. 2, a block diagram of an example system 200, in accordance with aspects of the present disclosure, is shown. In some configurations, the system 200 can include a processor 202, a memory 204, an input 206, an output 208, and may be configured to carry out steps, in accordance with methods described herein, including an image analysis that relies on texture information obtained from multi-parametric magnetic resonance imaging ("MR") to characterize various tissues in a subject.

In general, the system 200 may be any device, apparatus or system configured for carrying out instructions for, and may operate as part of, or in collaboration with a computer, system, device, machine, mainframe, or server. In this regard, the system 200 may be a system that is designed to integrate with a variety of software and hardware capabilities and functionalities, and may be capable of operating autonomously or semi-autonomously. In some aspects, the system 200 may be portable, such as a mobile device, tablet, or other portable device or apparatus.

The input 206 may be configured to receive a variety of data, information and user selections. For instance, user selections may be received by way of different input elements, such as a mouse, keyboard, touchpad, touch screen, buttons, and the like. The system 200 may also be configured to receive or access information or data directly from an imaging system 210, storage server 212, or database 214, by way of wired or wireless connection. As an example, the imaging system 210 can include an MR imaging system, however other imaging systems may also be possible. The system 200 may further obtain data or information via flash-drive, compact disc drive, or other computer-readable medium input device.

In addition to being programmed to carry out various steps for operating the system 200, the processor 202 may also be programmed to perform steps for retrieving or accessing multi-parametric magnetic resonance ("MR") images via input 206. In addition, the processor 202 may also be programmed to characterize imaged tissues in a subject by processing received or accessed images, as well as other information associated with the subject. As shown in FIG. 2, the processor 402 may receive processed or unprocessed multi-parametric images, data and other information associated with one or more subjects. Example images may include T1-Weighted ("T1W") images, T2-Weighted ("T2W") images, diffusion tensor images ("DTI"), perfusion MR images, dynamic susceptibility-weighted contrast-enhanced ("DSC") perfusion MR images, and other images.

In some aspects, the processor 202 may include a pre-processing unit (not shown in FIG. 2) configured to perform a number of pre-processing steps on the received or accessed images. For instance, pre-processing steps carried out by the processor 202 and/or pre-processing unit can also include performing various image registration algorithms, such as rigid registration. Pre-processing steps may also include performing image reconstruction to generate various images or maps using acquired MR imaging data and other data. Pre-processing may also include performing steps for correcting motion errors, field bias errors, and so forth. In addition, an intensity standardization or normalization may also be performed by the processor 202 or pre-processing unit in order to reduce intensity non-uniformity effects between different multi-parametric MR images.

In processing the received or accessed images, the processor 202 may be programmed to perform a texture analysis to generate texture information corresponding to selected or identified ROIs, as described. To this end, the processor 202 may be configured to display images and receive an indication from a user regarding selected ROI(s). Additionally, or alternatively, an automated segmentation technique may be used by the processor 202 to generate the ROI(s). Corresponding ROI(s) from different multi-parametric MR images may then be used in the texture analysis.

As described, texture information may include a number of texture features obtained by applying various texture algorithms, such as a Gray Level Co-Occurrence Matrix ("GLCM") algorithm, a Local Binary Patterns ("LBP") algorithm, a Discrete Orthonormal Stockwell Transform ("DOST"), and others. In some aspects, the processor 202 may be programmed to reduce dimensionality of generated texture features by using a Principle Component Analysis ("PCA").

Using the generated texture features, the processor 202 may be programmed to apply a classification scheme to characterize tissues in the ROI(s). In this manner, different tissue types present in ROIs may be identified by the processor 202. Example, tissue types may include normal and abnormal tissue, or tissues with different tumor grades, tumor types, genetic profiles or drivers, and so on. In the classification scheme, tissue types may be identified by comparing texture features of voxels or pixels in the ROIs with a classification model stored in the memory 204, database 214, storage server 212, or other storage location, in the form of parameters, data, or other information.

In some aspects, the processor 202 may also be configured to generate a classifier, or a classification model. To this end, the processor 202 may be configured to process various multi-parametric images, and other data, acquired from a plurality of subjects. In some aspects, the processor 202 may be configured to perform a machine learning technique based on a sequential forward feature selection process to generate a classification model identifying a subset of image-based principle components with the greatest combined tumor discrimination, for example. As described, the classification model may also discriminate different tissues, tumor types, tumor grades, genetic drivers, and so on.

In one aspect, the processor 202 may be programmed to determine various biopsy locations based on characterized tissues in the ROIs. In another aspect, the processor 202 may be programmed to determine a genetic profile of tissues in the ROI, such as a genetic heterogeneity or genetic homogeneity. In yet another aspect, the processor 202 may be programmed to adapt a treatment may be adapted based on characterized tissues in the ROIs.

The processor 202 may also be configured to generate a report and provide it to a user via the output 208, which may be a display. The report may be in any form and provide various information. In some aspects, the report may include images or maps indicating various normal, and/or abnormal tissue or structures in the subject, such as brain and other tissues or structures. The report may also include indicate regions or locations of various tumor content, genetic profiles, and so forth. The report may also provide quantitative information regarding tissue characteristics and distribution, including tissue types, profiles, volumes, and so forth. In addition, report may include one or more of the overlaid multi-parametric MR images. As described, the report may further indicate locations for biopsies, or a genetic heterogeneity.

The above-described method and system may be further understood by way of the examples below. These examples are offered for illustrative purposes only, and are not intended to limit the scope of the present invention in any way. Indeed various modifications in addition to those shown and described herein will become apparent to those skilled in the art from the foregoing descriptions and the following example, and fall within the scope of the appended claims.

Example I

Investigations were carried out to help identify more accurately locations of glioblastoma ("GBM") tumors for surgical biopsy. Patients with clinically suspected GBM undergoing preoperative stereotactic MRI for surgical resection were recruited. The absence of previous treatment (including steroid administration) was confirmed and subjects with an estimated glomerular filtration rate <60 mg/min/1.72 $m^2$ were excluded.

Pre-operative MR images, including T1-Weighted contrast-enhanced (T1+C) and T2-Weighted sequences (T2W), were used to guide stereotactic biopsies. In particular, each neurosurgeon collected an average of 5-6 tissue specimens from each tumor by using stereotactic surgical localization, and the smallest possible diameter craniotomies to minimize brain shift. Selected targets were separated by at least 1 cm from both for enhancing core (using T1+C) and non-enhancing BAT (using T1+C and/or T2W) regions in pseudo-random fashion, typically from different poles of the enhancing lesion periphery while avoiding any necrotic regions, based on clinical feasibility as per clinical protocol. Biopsy locations were recorded via screen capture to allow subsequent coregistration with multi-parametric MRI datasets. The neurosurgeon visually validated stereotactic imaging locations with corresponding intracranial anatomic landmarks, such as vascular structures and ventricle margins, before recording specimen locations.

Tissue specimens (target volume of 125 mg) were flash frozen in liquid nitrogen within 1-2 min from collection in the operating suite and stored in −80° C. freezer until subsequent processing. Tissue was retrieved from the freezer and embedded frozen in optimal cutting temperature ("OCT") compound. Tissue was cut in 4 μm sections in a −20 degree C. cryostat (Microm-HM-550) utilizing microtome blade. Tissue sections were then stained with hematoxylin and eosin ("H&E") for neuropathology review. H&E slides were reviewed blinded to diagnosis by a neuropathologist and assessed for tumor content. Taking into account all visible cells (neurons, inflammatory cells, reactive glia, tumor cells, and so on.), the percent tumor nuclei were estimated. Based on the TCGA criteria, the threshold of at least 80% tumor nuclei content was used to define tumor-rich (i.e., high tumor) biopsy samples. Those with less than 80% tumor content were classified as low tumor samples.

All imaging was performed on a 3 Tesla system (Sigma HDx; GE-Healthcare, Milwaukee, Wis.) within 1 day prior to stereotactic surgery. Images included pre- and post-contrast T1-Weighted (T1W−C, T1W+C, respectively) and pre-contrast T2-Weighted (T2W) sequences. T1W images were acquired using spoiled gradient recalled-echo inversion-recovery prepped (SPGR-IR prepped) (TI/TR/TE, 300/6.8/2.8 ms; matrix, 320×224; FOV, 26 cm; thickness 3 mm). T2W images were acquired using fast-spin-echo (FSE) (TR/TE, 5133/78 ms; matrix 320×192; FOV 26 cm; thickness 2 mm). T1+C images were acquired after completion of Dynamic Susceptibility-weighted Contrast-enhanced ("DSC") Perfusion MRI ("pMRI") following total Gd-DTPA (gadobenate dimeglumine) dosage of 0.15 mmol/kg as described below.

DTI imaging was performed using Spin-Echo Echoplanar imaging (EPI) [TR/TE 10000/85.2 ms, matrix 256×256; FOV 30 cm, 3 mm slice, 30 directions, ASSET, B=0,1000]. The original DTI image DICOM files were converted to a FSL recognized NIfTI file format, using MRIConvert (http://lcni.uoregon.edu/downloads/mriconvert), before processing in FSL from semi-automated script. In total, 12 DTI parametric maps were calculated using FSL (http://fsl.fmrib.ox.ac.uk/fsl/fslwiki/), including: isotropic (p) and anisotropic (q) diffusion, mean diffusivity ("MD") and fractional anisotrophy ("FA") based on previously published methods DSC-pMRI: Prior to DSC acquisition, a preload dose ("PLD") of 0.1 mmol/kg was administered to minimize T1W leakage errors. After PLD, Gradient-echo ("GE") EPI [TR/TE/flip angle=1500 ms/20 ms/6°°, matrix 128×128, thickness 5 mm] was employed for 3 minutes. At 45 sec after the start of the DSC sequence, another 0.05 mmol/kg i.v. bolus Gd-DTPA was administered. The initial source volume of images from the GE-EPI scan contained negative contrast enhancement (i.e., susceptibility effects from the PLD administration) and provided the MRI contrast labeled EPI+C. At approximately 6 minutes after the time of contrast injection, the T2*W signal loss on EPI+C provides information about tissue cell density from contrast distribution within the extravascular, extracellular space. Leakage correction was performed and relative cerebral blood (rCBV) calculated based on the entire DSC acquisition using IB Neuro. rCBV values were also normalized to contralateral normal appearing white matter.

For image co-registration, tools from ITK (www.itk.org) and IB Suite (Imaging Biometrics) were employed. Because the majority of MRI contrasts (4 out of 8) originated from the DTI acquisition, all datasets were co-registered to the relatively high quality DTI B0 anatomical image volume. This offered the additional advantage of minimizing potential distortion errors (from data re-sampling) that could preferentially impact the mathematically sensitive DTI metrics. This also avoided up-sampling of advanced MRI maps to the relatively high resolution of T1W stereotactic data (particularly when acquired with 512×512 matrix), which could result in textural artifacts during image processing. Ultimately, the co-registered data used for texture analysis exhibited in plane voxel resolution of approximately 1.2 mm (256×256 matrix) and slice thickness of approximately 3 mm.

A board-certified neuroradiologist placed square (8×8 voxel) regions of interest ("ROIs") at the locations corresponding to each biopsy site. For analysis, the extracted ROIs were obtained from original images and each was analyzed independently. Prior to texture analysis, various first order statistics from raw image signals were computed, including the average and standard deviation ("SD") of gray-level intensities. Next, intensity values within each extracted ROI were mapped onto the range 0-255. This helped standardize intensities between the different ROIs, thus reducing effects of intensity non-uniformity on features extracted during subsequent texture analysis.

In this study, three separate texture algorithms were employed to characterize GBM's regional variability in histologic tumor content, as described below. Use of multiple texture algorithms may be advantageous in order to complementary texture information. Each of the three texture analysis methods was applied for each ROI, which generated a total of 30 texture features for each of 8 total MRI contrasts (T1+C, T2W, rCBV, EPI+C, p, q, MD, FA) Therefore, at each co-registered ROI, a total of 240 texture features were calculated, in addition to the 16 raw features (i.e., mean, SD for 8 MRI contrasts), yielding a total of 256 image-based features for classification. The 3 texture analysis methods are described briefly below.

Gray Level Co-Occurrence Matrix ("GLCM") provides detailed gray scale data by describing the angular relationships and distances between neighboring image voxels with similar gray scale intensities. Commonly used in texture analysis, GLCM uses second order statistics of the distribution of gray-scale intensity level within a region of interest. Each element in the co-occurrence matrix shows how often a pair of intensity levels is seen in a configuration defined by a certain radius and angle. The co-occurrence matrix was computed by averaging over four uniformly distributed angular directions (0°, 45°, 90°, and 135°) to produce a set of 13 rotationally invariant features. These included: entropy (matrix randomness), energy/angular second moment (pixel repetition/orderliness, measures image homogeneity), homogeneity (uniformity of co-occurrence matrix), dissimilarity (measurement of how different each matrix element is), and correlation (measurement of graytone linear dependencies). In total, 13 GLCM texture features were calculated at each ROI for each MRI contrast.

Local Binary Patterns ("LBP") provides highly discriminatory rotational and illumination invariant structural information by labeling each image voxel (in binary fashion) as higher or lower intensity compared with neighboring voxels. In providing texture description, LBP evaluates the intensity distribution of the set of points within a certain radius of each voxel in an ROI. Local binary numbers are categorized into 'uniform' and 'non-uniform' patterns based on the number of bit-wise transitions from 0 to 1 or vice versa. A histogram of the labels is used as a measure of ROI uniformity. The neighborhood radius of three voxels (the 24 points circularly surrounding each voxel) was used here as an ROI for the present experiments Given the 8×8 voxel ROI size, the 3-voxel radius represents the maximum for confining analysis within the ROI while providing larger scale pattern analysis. A smaller radius (e.g., 1-voxel or 2-voxel was not chosen because these provide smaller scale patterns that are already provided by GLCM. The value of bins in a 12-bin histogram was reported as the set of feature for this method. In total, 12 LBP texture features were calculated at each ROI for each MRI contrast.

Discrete Orthonormal Stockwell Transform ("DOST") directly measures local spatial frequencies, which have shown specific applicability to neurologic diseases such as glioma. The DOST provides a complete minimal multi-resolution spatial-frequency representation of an image. It maintains the phase information while avoiding redundant calculations of time-frequency information and thus being computationally less expensive. The two-dimensional DOST uses a dyadic sampling scheme (orders 0, 1, 2 ... Log (N)−1) to partition the 2D Fourier transform of the image into non-overlapping sections. Each section, including only a band-limited subspace of the FT domain, is shifted in frequency and phase to produce the DOST image. Averaging DOST elements in each section results in a harmonics image from which we calculated rotationally invariant features. In total, 5 DOST features were calculated at each ROI for each MRI contrast.

A Principal Component Analysis ("PCA") was used for dimension reduction. Specifically, with a total of 256 image-based features from each ROI and corresponding biopsy sample, the dimensionality of the image-based features far exceeded the sample size, increasing the risk of oversampling artifacts and creating challenges for classification. To address this, PCA was used to reduce the dimensionality of the imaging data, separately for each MRI contrast and texture algorithm. In particular, PCA finds linear combinations of features, called Principal Components ("PCs") or "super features" that summarize all features for a given texture analysis method. Usually, between 1-3 PCs sufficiently account for the variability in the original feature space, which allows the reduction in dimensionality. PCs were separately derived for each MRI contrast and each texture analysis algorithm and those PCs that accounted for 85% of original feature variability were selected for further analysis.

Classification algorithms with sequential forward feature selection were used to identify the subset of image-based PCs (determined from PCA above) with the greatest combined discrimination for biopsy tumor content (high- vs low-tumor). To represent the spectrum of classification methodologies, 3 distinct but commonly described classification algorithms were separately applied: Diagonal Linear Discriminate Analysis ("DLDA"), Diagonal Quadratic Discriminate Analysis ("DQDA") and Support Vector Machines ("SVM"). As the names imply, DLDA identifies linear classification boundaries to separate classes, while DQDA identifies quadratic boundaries. SVM can identify complex boundaries for class separation. Classification accuracy was determined using leave-one-out cross validation ("LOOCV") using each classification algorithm.

With LOOCV, all samples but one are used to develop the classifier, using the training set, with one randomly chosen sample serving as the test case for classification performance. This process was repeated for all samples in the dataset (i.e., 60 separate trial runs in this cohort), until each sample in the cohort served as the test sample. LOOCV then averages the accuracies for all repetitions to determine the overall cross validation ("CV") accuracy. Sequential forward feature selection of PCs was also used, which identifies the PC with greatest discriminatory power (e.g. PC1), then evaluates and adds any remaining PCs that contribute incremental gains to classification accuracy. The iterative process continued to add remaining PCs to the classification model until accuracy gains ceased (defined as incremental gain of <1%). Of all ML methods, DLDA identified the highest CV accuracy with the fewest required PCs, as shown in Table. 1. As such, results are reported from the DLDA analysis.

TABLE 1

Classification accuracies and selected MRI features based on DLDA, DQDA, and SVM classification methods.

| Selected MRI features | Incremental accuracy gain |
|---|---|
| DLDA | |
| Overall accuracy 85% | |
| rCBV-Raw Mean | 75% |
| GLCM-EPI + C | 5% |
| LBP-T1 + C | 5% |
| DQDA | |
| Overall accuracy 80% | |
| DOST-T1 + C | 66.67% |
| rCBV-Raw Mean | 13.33% |
| SVM | |
| Overall accuracy 80% | |
| rCBV-Raw Mean | 80% |

In total, 82 biopsy samples were collected from 18 GBM patients. Table 2 below describes the distribution of training (60 biopsies, 11 patients) and validation (22 biopsies, 7 patients) biopsy samples throughout enhancing core ("ENH") and BAT. The vast majority of biopsies (90%) were separated by >1 cm. Overall, 59.2% of tissue samples from ENH demonstrated high tumor content, similar to the frequency of adequate tumor samples reported by the TCGA (60.2%). When samples originated from BAT, a much lower percentage (21.2%) of samples demonstrated high tumor content.

Classification algorithms, specifically DLDA, with sequential forward feature selection, identified three MRI-based texture features that optimized the classification model to distinguish high- vs. low-tumor biopsy samples. Table 3 lists each feature and their incremental contributions to CV accuracy for the training set data. Using mean rCBV alone, the classification model achieved CV accuracy of 75%.

TABLE 2

Summary of tissue samples and test performance in both training and validation datasets.

|  | Training Set (n = 11 subjects) | | | Validation Set (n = 7 subjects) | | |
| --- | --- | --- | --- | --- | --- | --- |
|  | ENH | BAT | Both | ENH | BAT | Both |
| Total samples | 35 | 25 | 60 | 14 | 8 | 22 |
| High tumor samples | 22 | 5 | 27 | 7 | 2 | 9 |
| (% of total samples) | (62.9%) | (20%) | (45%) | (50%) | (25%) | (41%) |
| Low tumor samples | 13 | 20 | 33 | 7 | 6 | 13 |
| (% of total samples) | (37.1%) | (80%) | (55%) | (50%) | (75%) | (59%) |
| Imaging accuracy (high vs low tumor) | 82.9% | 88% | 85.0% | 78.6% | 87.5% | 81.8% |
| Sensitivity (identify high-tumor) | 86.4% | 80% | 85.2% | 100% | 100% | 100% |
| Specificity (identify high tumor) | 76.9% | 90% | 84.8% | 57.1% | 83.3% | 69.2% |
| PPV (predict high tumor) | 86.4% | 66.7% | 82.1% | 70% | 66.7% | 69.2% |
| NPV (exclude high tumor) | 76.9% | 94.7% | 87.5% | 100% | 100% | 100% |

Adding GLCM-based texture features from EPI+C improved the model's classification accuracy incrementally by 5%, while adding a third feature, LBP-based texture from T1+C, improved the classification model yet another 5%. Thus, using all three MRI-based texture features yielded the final training CV accuracy of 85% (75%+5%+5%, Tables 2 and 3). In general, rCBV provides non-invasive measures of microvascular volume, which links closely to histologic tumor content, malignant potential, and prognosis. The EPI+C MRI contrast (measured at approximately 5 minutes after contrast injection) measures negative enhancement (i.e., signal loss) that persists on static T2*W Gradient Echo images from Gd-DTPA extravasation and distribution within the extracellular space. This has been linked closely to tissue cellular density. Finally, T1+C measures Gd-DTPA contrast enhancement from blood brain barrier ("BBB") disruption and represents a secondary feature of tumor aggression.

to that in the training dataset. Importantly, the model achieved a high degree of accuracy in non-enhancing BAT (88% training, 87.5% validation), which represents a problematic area for conventional CE-MRI-guided biopsies. Specifically, tumor-rich populations show low prevalence in the BAT (21.2% for all biopsies in the present study) and typically remain indistinguishable from non-tumor edema on CE-MRI. The positive predictive values ("PPV") of 66.7% in both training and validation sets suggests that using an MRI texture model, in accordance with aspects of the present disclosure, would significantly improve the localization and recovery of tumor-rich BAT targets compared to current CE-MRI guided biopsy methods, as shown in FIGS. 3A-F.

In particular, FIGS. 3A-F show ML-based MRI invasion maps illustrating tumor-rich (>80% tumor nuclei) extent throughout ENH and BAT. (A,B,C,E) Biopsy locations

TABLE 3

Summary of selected MRI-based texture features to optimize CV training accuracy.

| MRI-based feature | Texture algorithm | Texture description | MRI Contrast | Physiologic correlate | Incremental gain in CV accuracy |
| --- | --- | --- | --- | --- | --- |
| rCBV (raw mean) | — | — | Relative cerebral blood volume (rCBV) | Micro-vessel volume | 75% |
| EPI + C-GLCM | Gray level co-occurrence matrix (GLCM) | Gray scale intensities | T2*W negative enhancement (EPI + C) | Tumor cell density | 5% |
| T1 + C-LBP | Local binary product (LBP) | Structural uniformity | T1W contrast enhancement (T1 + C) | BBB disruption | 5% |

After completing the MRI feature selection on the training dataset (n=60), the optimized model (using all three features) was applied to classify high- vs. low-tumor content biopsies in a separate, retrospectively collected validation set (22 biopsies, 7 patients). The CV accuracy of the training set and the accuracy of applying the training model on the separate validation set are listed in Table 2 for both enhancing core ("ENH") and BAT. In the validation set, model classification achieved an overall accuracy (81.8%) similar within the non-enhancing BAT zone (green dots, arrows) on T1+1 (A,D) and T2W (B,E) images correspond to high-tumor (greater than 80% tumor nuclei) and low-tumor (less than 80% tumor nuclei) tissue samples on histological analysis. (C,F) Color overlay maps with manual tracings (green) around BAT show the probability (range 0-1) of tumor-rich (red) vs. tumor-poor (green/blue) content, based on ML analysis and multi-parametric MRI in the 60 training biopsies and 22 validation biopsies. The maps show correspondence between tumor-rich (B, red) and tumor-poor (D, blue/gray) biopsy samples. Ten percent of training set biopsies (n=6) were located within 5-10 mm of adjacent biopsies. To test the potential confounding effects on accuracy, we performed a sub-analysis that excluded these samples, as shown in Table. 4 With 54 total samples, the model achieved an accuracy of 85.2%, nearly identical to the main analysis, suggesting that the effects are negligible.

TABLE 4

Summary of tissue samples and test performance from subgroup analysis in training and validation datasets.

|  | Training Set (n = 11 subjects) | | | Validation Set (n = 7 subjects) | | |
| --- | --- | --- | --- | --- | --- | --- |
|  | ENH | BAT | Both | ENH | BAT | Both |
| Total samples | 33 | 21 | 54 | 14 | 8 | 22 |
| High tumor samples | 21 | 2 | 23 | 7 | 2 | 9 |
| (% of total samples) | (63.6%) | (9.5%) | (42.6%) | (50%) | (25%) | (41%) |
| Low tumor samples | 12 | 19 | 31 | 7 | 6 | 13 |
| (% of total samples) | (36.4%) | (90.5%) | (57.4%) | (50%) | (75%) | (59%) |
| Imaging accuracy (high vs low tumor) | 81.8% | 90.5% | 85.2% | 78.6% | 87.5% | 81.8% |
| Sensitivity (identify high-tumor) | 85.7% | 100% | 87% | 100% | 100% | 100% |
| Specificity (identify high tumor) | 75% | 89.5% | 83.9% | 57.1% | 83.3% | 69.2% |
| PPV (predict high tumor) | 85.7% | 50% | 80% | 70% | 66.7% | 69.2% |
| NPV (exclude high tumor) | 75% | 100% | 89.7% | 100% | 100% | 100% |

Genetic profiling represents the future of neuro-oncology but hinges on the recovery of adequate biopsy material from representative tumor segments. While contrast-enhanced MRI (serves as the current standard for image-guided surgery, distinct limitations exist. For instance, neurosurgeons routinely target CE-MRI enhancing core ("ENH") for its presumed tumor-rich composition, but this yields adequate tumor in only ~60% of the cases from TCGA and this example's cohort. Further, the BAT harbors residual populations that are most important to characterize because they universally recur, but the low prevalence of tumor-rich foci (~20% in this cohort) and the lack of enhancement in BAT limit the success of CE-MRI-guided biopsies. In this example, the detection of tumor-rich targets throughout ENH and BAT is improved by combining CE-MRI with advanced imaging and texture analysis. Advanced MRI metrics on diffusion tensor imaging ("DTI"), diffusion weighted imaging ("DWI"), and perfusion MRI ("pMRI") correlate with hallmark features of tumor aggression, such as white matter invasion (DTI), cellular proliferation (DWI), and tumoral angiogenesis (pMRI). Meanwhile, MRI texture—which characterizes regional heterogeneity and microstructure—can capture additional tissue features such as molecular status (i.e., MGMT, 1p/19q) and histological identity.

Previous glioma studies have used advanced MRI-guided stereotactic biopsies to validate the correlations with spatially matched regional histology. DWI and pMRI measurements were compared with tumor cell density, among other histological indices (e.g., microvascular hyperplasia, cell proliferation), in ENH and BAT biopsies. Compared with DWI, tumor cell density correlated more strongly with pMRI metrics, namely rCBV and relative peak height ("rPH") in ENH samples, and rPH in BAT samples. The correlations between apparent diffusion coefficient ("ADC"), which is closely related to MD), on DWI and tumor cell density have also been confirmed. Similarly, it was confirmed that ADC has the utility to identify regions of hypercellular non-enhancing tumor in ex-vivo cases, while another study found FA to be more informative than MD (closely linked to ADC). Finally, DTI thresholds for isotropic (p) and anisotropic (q) diffusion to distinguish normal white matter from tumor infiltration and gross replacement were determined While these studies have helped to establish advanced MRI-based correlates in glioma, none have tested the accuracy to classify biopsy targets based on quantitative thresholds for histological tumor content (e.g., greater than 80% versus less than 80% tumor nuclei). Further, the diagnostic value of combining multiple complementary metrics or extracting regional image texture patterns from advanced MRI maps is not yet known.

Based on the correlations in this training set, machine learning ("ML") has been used in this example to identify three MRI-based features that optimize classification accuracy for high- vs. low-tumor content (Table 3). Mean rCBV contributes the most to model accuracy, which aligns with previous pMRI studies showing strong correlations between rCBV and histological tumor content, tumoral proliferation, and malignant potential. In particular, densely cellular tumor elaborates large microvascular networks (to support metabolic demands), which correspond to elevated rCBV values on pMRI. Also, incremental gains in classification accuracy have been observed when the model incorporates texture features from EPI+C and T1+C images. Signal loss on T2*W EPI+C relates to contrast agent extravasation and subsequent equilibration within the extracellular space. Clinical and preclinical studies have shown how these susceptibility effects correlate strongly with tumor cell density and size, similar to using MD, ADC, and isotropic diffusion (p) on DWI and DTI. Meanwhile, signal changes on T1+C represent regional differences in contrast extravasation (and signal rise) due to blood brain barrier ("BBB") disruption. While T1+C routinely guides CE-MRI biopsies, this invention's model shows that structural uniformity textures, rather than simply the presence/absence of T1+C enhancement, provide the greater contribution to test accuracy.

Figure 4A:
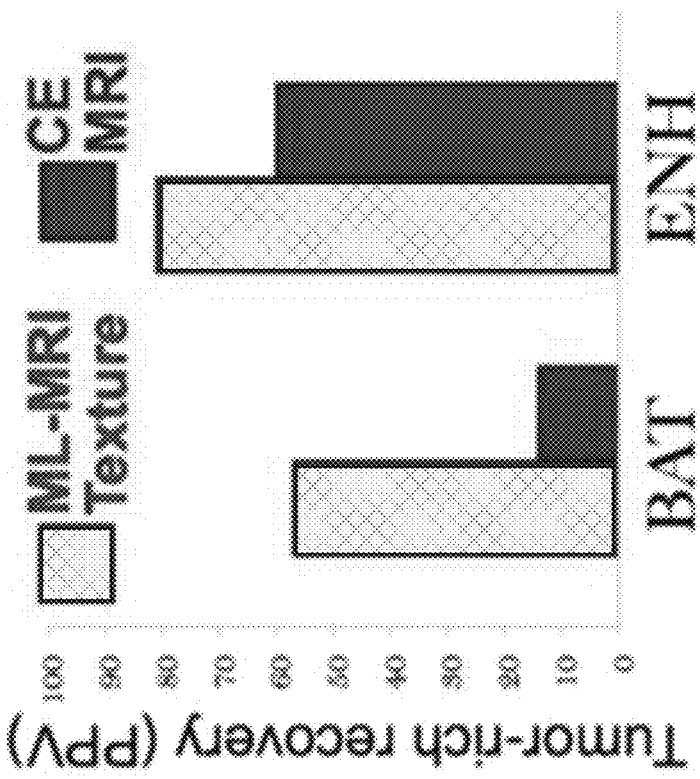
FIG. 4A is a graph comparing the detection of tumor-rich recovery using traditional methods and the present approach based on texture analysis of multi-parametric imaging.
Figure 4B:
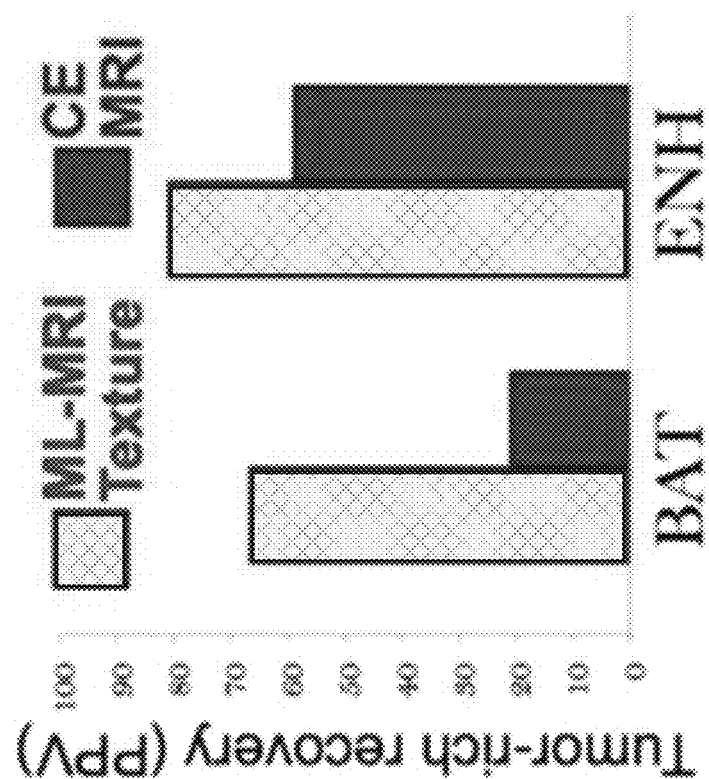
FIG. 4B is another graph comparing the detection of tumor-rich recovery using traditional methods and the present approach based on texture analysis of multi-parametric imaging.

Overall model accuracy (85% training, 81.8% validation) demonstrate that the approach described herein can be used to guide surgical biopsies and improve recovery of tumor-rich biospecimens compared to current CE-MRI methods. Particularly encouraging is the high model accuracy for non-enhancing BAT (88% training, 87.5% validation). Even in the subgroup analysis, which excludes 6 samples within 5-10 mm of each other, the ML-based model achieves high accuracy in BAT (90.5%). Based on current limitations of CE-MRI and low prevalence of tumor-rich foci in BAT (21% in full cohort, 13.7% in subgroup analysis), neurosurgeons would need approximately 5-7 biopsy attempts to recover one adequate tumor-rich sample (>80% tumor nuclei). The ML-based model's PPV of ~67% significantly improves the efficiency of tumor-rich recovery in the problematic non-enhancing BAT zone, as illustrated in FIGS. 4A-4B.

Also, the NPV (94.7% training, 100% validation) of the ML model suggests a high degree of confidence in excluding tumor-rich populations in tumor subregions, thereby improving surgical safety by preventing unnecessary biopsies. Besides biopsy guidance, the ML-based MRI texture model also presents applicability for improving the extent of maximal surgical resection, which correlates strongly with patient survival. Currently, CE-MRI guides gross total resection ("GTR") based on enhancing core ("ENH"), but this can leave substantial residual tumor burden in the non-enhancing BAT. Using the ML-based model to map tumor infiltration in BAT could help surgeons plan safer and more extensive resections to improve local control and patient outcomes. The example results described herein may then provide the impetus and justification for future clinical trials that integrate this ML-based model into neuronavigational platforms to prospectively validate test accuracy and potential clinical impact.

A number of studies have shown the utility of intraoperative fluorescence microscopy with 5-aminolevulinic acid ("5-ALA") to facilitate gross total resection ("GTR") of ENH, which currently represents the primary target of surgical biopsy and resection. The ENH tumor segment is well visualized on CE-MRI because of gadolinium-based contrast agent ("GBCA") extravasation through a disrupted blood brain barrier ("BBB"). This BBB dependence also accounts for 5-ALA visualization of the ENH tumor segment, which may explain why both CE-MRI and 5-ALA poorly characterize the non-enhancing invasive tumor in BAT (which maintains BBB integrity). In fact, 5-ALA shows poor sensitivity for detection of invasive non-enhancing tumor in BAT, with negative predictive value ("NPV") as low as 26%. For these reasons, the invasive tumor segment in BAT typically remains unresected, unbiopsied, and uncharacterized despite the use of CE-MRI and/or 5-ALA guidance. Neglecting BAT tumor has particular impact on the selection of adjuvant targeted therapy, under the paradigm of individualized oncology, because the invasive tumor segment represents the focus of adjuvant therapy but can harbor different therapeutic targets than those detected in ENH biopsies. Unless these BAT targets are biopsied and characterized, sampling error can hence misinform treatment, potentiating recurrence of pre-existing resistant clones. The approach presented here helps to address this critical need, by significantly improving the detection and recovery of tumor-rich biopsies in the problematic non-enhancing BAT zone (FIG. 4A-B).

Herein, high tumor content (>80% tumor) was defined based on published TCGA criteria for sample adequacy. This threshold helps to maximize tumor DNA quality by minimizing non-tumor contamination. While this approach demonstrates high accuracy to distinguish tumor content based on this specific histological threshold, classification of samples based on other thresholds (e.g., 20%, 50%, 75% tumor nuclei) may also be possible, which may include a re-training of the ML model to maximize diagnostic accuracy. In other words, an ML model for one histological threshold may not necessarily optimally translate to other histological thresholds. Nonetheless, additional ML models can be developed for other clinically relevant histological thresholds, or potentially for prediction of tumor cell density as a continuous variable (i.e., tumor nuclei range from 0-100%). Different histological thresholds may also favor specific MRI-based phenotypes. For instance, high tumor density may select for "proliferative" imaging phenotypes, while lower tumor thresholds (i.e., >50% or >20% tumor fraction) may associate with "invasive" phenotypes in which tumor admixes more evenly with surrounding non-tumor parenchyma. Thus, while DWI and DTI metrics were not selected in this example, they may prove useful when evaluating other tumor thresholds. Such thresholds may have greater applicability for image-guided interventions such as radiation therapy ("RT"), which generally targets both densely cellular tumor and more diffusely infiltrative tumor-poor regions.

Principal Component Analysis ("PCA") was used here to help interpret the high dimensional data that resulted from combining multiple texture algorithms and complementary MRI contrasts. Specifically, PCA identified linear combinations principal components that account for most variability across the original features. This eliminated more than 90% of the original features and distilled the imaging data to only a few representative PCs for each MRI contrast. This aligns the dimensionality of imaging data with available sample size. Also, three different classification algorithms (DLDA, DQDA, SVM) were employed to help represent a broader spectrum of methodologies that might impact the development and training of our classification model. Of the three algorithms, DLDA appeared to provide the greatest test accuracy with the fewest required PCs to build the predictive model.

While the present example demonstrated proof of concept that multi-parametric MRI and texture analysis can facilitate tumor localization, it is envisioned that these findings may be validated in a larger patient population. In addition, the adequacy of tumor content was classified based on well-established guidelines, ensuring the quality of DNA isolation and the integrity of genetic analysis. Nonetheless, the requirements for tumor content may change as genetic sequencing technology improves, and hence the present approach may be modified based on other histological criteria and/or tumor thresholds. Furthermore, it is possible that image distortions and brain shift following craniotomy could lead to registration errors. To compensate, small craniotomy sizes were used to minimize brain shift, as well as visual validation with intracranial neuroanatomic landmarks of the stereotactic image locations to help correct for random brain shifts. Also, rigid-body co-registration of stereotactic and DSC-MR imaging was also used to help reduce possible geometric distortions. Furthermore, for each patient analyzed, multiple tissue samples were collected from spatially distinct subregions within the same tumor. The vast majority of biopsy targets were separated by greater than 1 cm. While approximately 10% of samples were separated by 5 to 10 mm, small ROI sizes minimized the effects of potential sample overlap. Nonetheless, a subanalysis was performed that excluded these minority samples, which demonstrated comparable accuracies to the main study, suggesting negligible impact.

Example II

Inverted papilloma ("IP") is an uncommon epithelial tumor that occurs in the sinonasal tract. Although benign, it can exhibit aggressive behavior including a propensity for invasion and recurrence. The association of IP with synchronous or metachronous squamous cell carcinoma ("SCCA") is well documented, making the differentiation of these tumor types using imaging highly relevant. Although a convoluted cerebriform pattern is often visible on conventional magnetic resonance imaging ("MRI"), it is indicative of, but not entirely specific to IP. Moreover, such pattern represents a subjective finding that suffers from interobserver variability, particularly with smaller tumors. As such, it is desirable to find ways allowing accurate, objective, and potentially automated differentiation of sinonasal IP from SCCA.

Therefore, a retrospective study was carried out using imaging data obtained from a pathology database. The database was electronically queried to identify patients who underwent surgical resection of sinonasal IP or SCCA between Jan. 1, 2008 and Dec. 31, 2014. For inclusion, a diagnostic quality MRI obtained pre-operatively was desirable, to include axial T1, axial T2 fat-suppressed, and axial T1 post-contrast fat-suppressed MRI sequences (1.5 or 3 Tesla) for texture analysis. Subjects were excluded if their age was less than 18 years or if they had received any prior treatment for the tumor with surgery, chemotherapy, or radiation therapy.

Images were re-sampled to ensure each had an 18 cm field-of-view and a 256×256 pixel array. Next, image intensities were normalized to have the dynamic range of 0-255. A board-certified neuroradiologist identified the axial level at which the tumor had the greatest cross-sectional area and manually placed the largest possible rectangular region of interest ("ROI") within the tumor. For each ROI, five widely-known texture algorithms including Gray Level Co-occurrence Matrix, Discrete Orthonormal Stockwell Transform, Gabor Filter Banks, Local Binary Pattern, and Laplacian of Gaussian Histogram were applied to generate the texture features. Next, a principle component analysis ("PCA") for reducing the dimensionality of the features was applied, increasing the robustness of the predictive models. Then, multiple machine-learning algorithms were used to find correlations between (potentially non-linear) combinations of texture features and tumor type (IP or SCCA). Leave-one-out cross-validation was used to identify the most accurate machine-learning derived models.

A total of 16 subjects with sinonasal IP (58.0±12.5 years; 12:4 M:F) and 17 subjects with SCCA (54.0±13.9 years; 13:4 M:F) were included in the study. The largest common ROI for all tumors was 16×16 pixels, which served as the input for texture analysis. The most information-rich texture features were obtained from the T1 post-contrast fat-suppressed sequences. Multiple classification models were able to distinguish the two histologic tumor types with 91% accuracy (94% specificity and 88% sensitivity). Therefore, multi-parametric MRI in conjunction with advanced imaging informatics techniques (texture analysis and machine learning) can help non-invasively distinguish sinonasal IP from SCCA. It is envisioned that future directions might include prospective validation of this approach.

Example III

Glioblastoma ("GBM") exhibits broad genetic diversity that contributes to treatment resistance and poor survival. Recent discoveries through genetic profiling have given insight to new strategies for improving outcomes. In particular, the paradigm of individualized oncology selects treatments to match the targetable aberrations within each tumor. While this approach seeks to maximize drug response and patient survival, GBM's intratumoral heterogeneity creates significant challenges. Specifically, each tumor comprises multiple genetically distinct clonal populations, so called "many tumors in one" that can express different therapeutic targets. This renders non-localizing biopsies prone to sampling errors, since genetic profiles from one location may not accurately reflect other subregions. Such errors can misguide treatment, leading to poor or incomplete response. Further, contrast-enhanced MRI ("CE-MRI") guides surgical targeting from enhancing regions ("ENH"), but neglects the clonal populations within the non-enhancing parenchyma, so called brain around tumor ("BAT"). These BAT populations remain unresected and poorly characterized, despite representing the primary targets of adjuvant therapy and the main contributors to recurrence. These issues underscore the need to better characterize GBM's intratumoral genetic heterogeneity, particularly within the non-enhancing BAT.

As an integral part of clinical practice, MRI can characterize a diverse spectrum of tumoral phenotypes as potential biomarkers of genetic status. For instance, enhancement on CEMRI correlates with blood brain barrier ("BBB") disruption, while T2W/FLAIR abnormalities demarcate tumoral edema in the BAT. Advanced MRI can report other biophysical features, such as tumor cell density on diffusion-weighted imaging ("DWI"), white matter infiltration on diffusion tensor imaging ("DTI"), and microvessel morphology on perfusion MRI ("pMRI"). In addition, MRI spatially encodes signal intensity values for all voxels comprising each image.

The textural patterns between voxel intensities and their surrounding neighbors provide further insight to tissue microstructure and the local environment. Numerous studies have correlated both MRI signal and texture analysis with genetic profiles in GBM. Yet, these have been limited in resolving the challenge of GBM's intratumoral heterogeneity. A major reason is that most groups use non-localizing biopsies to determine a single representative profile for an entire tumor. As a result, this cannot account for the genetic diversity throughout the various tumor subregions. Also, most biopsies originate from MRI enhancement, as per routine surgical practice, so tumor profiles from the non-enhancing BAT are typically underrepresented. Thus, particularly for tumors that ultimately receive a gross total resection of MRI enhancement, the molecular targets of the BAT are unknown.

In this exploratory study, the feasibility of using multi-parametric MRI and texture analysis is evaluated to characterize the regional genetic heterogeneity throughout the ENH and BAT tumor segments of GBM. To accomplish this, multiple image-guided biopsies were collected throughout both segments in a cohort of patients with primary GBM. For each biopsy, genome-wide DNA somatic copy number variants ("CNVs") were analyzed to determine the regional status for highly recurrent and biologically significant GBM driver genes, as previously determined by The Cancer Genome Atlas ("TCGA"). These include known therapeutic targets and core GBM pathways such as receptor tyrosine kinase ("RTK"), phosphoinositide 3-kinase ("PI3K"), mitogen-activated protein kinase ("MAPK"), Tumor protein ("p53"), and Retinoblastoma ("Rb1"). Each biopsy location was co-registered preoperative multi-parametric MRI, which included CE-MRI, DWI, DTI, and pMRI. This allowed regional genetic status to be correlated with spatially matched imaging measurements, including raw MRI signal and MRI-based texture features. Finally, both univariate and multivariate analyses were used to determine which MRI-based features correlate most strongly with regional status for each driver gene. Developing such image-based biomarkers that can improve diagnostic accuracy and treatment selection under the paradigm of individualized oncology.

Patient Recruitment:

Patients with clinically suspected GBM undergoing pre-operative stereotactic MRI for surgical resection were recruited. The absence of previous treatment (including steroid administration) was confirmed. Approval from the institutional review boards and obtained written and informed consent from each subject was obtained prior to enrollment.

Surgical Biopsy:

Pre-operative conventional MRI was used, including T1-Weighted contrast-enhanced (T1+C) and T2-Weighted sequences (T2W), to guide stereotactic biopsies as previously described. In short, each neurosurgeon collected an average of 5-6 tissue specimens from each tumor using stereotactic localization, following the smallest possible diameter craniotomies to minimize brain shift. Neurosurgeons generally selected targets separated by >1 cm from both ENH (T1+C) and non-enhancing BAT (T1+C,T2W) regions within different poles of the tumor based on clinical feasibility (e.g., accessibility of the target site, overlying vessels, eloquent brain). Neurosurgeons recorded biopsy locations to allow subsequent coregistration with multi-parametric MRI datasets. The neurosurgeon visually validated stereotactic imaging locations with corresponding intracranial anatomic landmarks, such as vascular structures and ventricle margins, before recording specimen locations.

Histologic Analysis and Tissue Treatment:

Tissue specimens (~125 mg) were flash frozen in liquid nitrogen within 1-2 min from collection in the operating suite and stored in −80° C. cutting temperature (OCT) compound. Tissue was sectioned (4 μm) in −20° C. cryostat (Microm-HM-550) utilizing microtome blade, stained with hematoxylin and eosin (H&E), and reviewed by neuropathology to ensure adequate tumor content (>50%).

Genetic Profiling and Analysis:

DNA/RNA isolation was performed, and copy number variant (CNV) was determined for all tissue samples using array CGH (aCGH) and exome sequencing as previously published and further detailed below. This included application of previously described CNV detection to whole genome long insert sequencing data and exome sequencing.

Copy Number Variant (CNV) Aberrations of Interest:

TCGA has previously identified a set of highly recurrent and biologically significant DNA gains and losses through copy number analysis. These CNVs comprise known therapeutic targets and/or core GBM pathways: RTK, PI3K, MAPK, p53, and Rb1. For this study, tumor samples which demonstrated aberrations for each CNV were determined. To adequately power image-genetic correlative studies, the study proceeded with those CNVs altered in >20% of our tumor samples. CNVs such as c-MET amplification on 7q31.2, observed in only 1 out of 48 (2.1%) total samples, were excluded from further analyses.

DNA/RNA Isolation:

DNA from fresh frozen tissue specimens were isolated using DNAeasy Blood and Tissue Kit (Qiagen #69504) and RNAeasy Mini Kit (Qiagen #74104). Matched normal patient DNA was extracted and purified from the blood using a QIAamp DNA Blood Midi Kit/QIAamp Mini Kit from QIAGEN.

Exome Sequencing:

Exome sequencing was performed, along with data acquisition and analysis as previously described. 1.1 μg genomic tumor and normal DNA for each sample was fragmented to a target size of 150-200 bp on Covaris E210. 100 ng of fragmented product was run on TAE gel to verify fragmentation. The remaining 1 μg of fragmented DNA was prepared using Agilent's (Santa Clara, Calif.) SureSelectXT and SureSelectXT Human All Exon 50 Mb kit (catalog #G7544C). Exome libraries were prepared with Agilent's SureSelectXT Human All Exon V4 library preparation kit (catalog #5190-4632) and SureSelectXT Human All Exon V4+UTRs (catalog #5190-4637) following manufacturer's protocols.

Alignment and Copy Number Variant Calling:

For exome sequencing, fastq files were aligned with BWA0.7.8 to GRCh37.62 and SAM output were converted to a sorted BAM file using SAMtools0.1.19. BAM files were then processed through indel realignment, mark duplicates, and recalibration steps. Lane level sample BAMs were then merged with Picard1.65 if they were sequenced across multiple lanes. Previously described copy number variant ("CNV") detection was applied to the whole genome long insert sequencing data and exome sequencing. CNV detection was based on a log 2 comparison of normalized physical coverage (or clonal coverage) across tumor and normal sequencing data, where physical coverage was calculated by considering the entire region a paired-end fragment spans on the genome, then the coverage at 100 bp intervals was kept. Normal and tumor physical coverage was then normalized, smoothed and filtered for highly repetitive regions prior to calculating the log 2 tumor/normal ratio. Exome sequencing CNV was compiled for each patient and aberrations were reported in the same format of aCGH output.

Array CGH Method:

For array CGH, DNA from frozen tumor was extracted using the Allprep DNA/RNA mini kit (Qiagen) following the manufacturer's protocol. With FFPE samples DNA was extracted using Allprep FFPE DNA/RNA mini kit (Qiagen). Pooled male or female DNA from a commercial source (Promega) was used as a reference. Tumor samples and references (1 μg each) were digested with DNaseI and labelled with Cy-5 dUTP and Cy-3 dUTP, using the BioPrime labelling kit (Life Technologies). All labelling reactions were assessed using a Nanodrop assay before mixing and hybridized to 244,000 feature human genome CGH arrays (Agilent Technologies) according to manufacturer's instructions (CGH-enzymatic-protocolv6.2; Ref #G4410-90010). Microarray slides were scanned using an Agilent 2565C DNA scanner, and the images were analyzed with Agilent Feature Extraction version 10.5, using default settings. Data were assessed with a series of quality control metrics and analyzed using an aberration detection algorithm (ADM2)26 implemented in the Genomic Workbench software package (Agilent). ADM2 identifies all aberrant intervals in given samples with consistently high/low log ratios based on statistical score derived from average normalized log ratios of all probes in the genomic interval multiplied by square root of number of these probes. This score represents the deviation of the average of normalized log ratios from its expected value of zero and is proportional to the height, h (absolute average log ratio), of the genomic interval and to the square root of number of probes in the interval.

MRI Protocol, Parametric Maps, and Image Coregistration:

Conventional MRI and acquisition conditions: 3T MRI was acquired (Sigma HDx; GE-Healthcare, Milwaukee, Wis.) within 1 day prior to stereotactic surgery. Specifically, post-contrast T1-Weighted (T1+C) SPGR-IR (TI/TR/TE=300/6.8/2.8 ms; matrix=320×224; FOV, 26 cm; thickness=2 mm) and T2-Weighted (T2W) fast-spin-echo (TR/TE=5133/78 ms; matrix=320×192; FOV=26 cm; thickness=2 mm) were acquired. Also, T1+C images were acquired after completing Dynamic Susceptibility-weighted freezer until subsequent processing. Tissue was retrieved and embedded frozen in optimal Contrast-enhanced ("DSC") Perfusion MRI ("pMRI") were acquired following total Gd-DTPA (gadobenate dimeglumine) dosage of 0.15 mmol/kg as described. Diffusion Tensor Imaging ("DTI") was acquired using Spin-Echo Echo-planar imaging (EPI) (TR/TE=10000/85.2 ms, matrix=256×256; FOV=30 cm, slice=3 mm, 30 directions, B=0,1000). The following parameters were calculated: isotropic (p) and anisotropic (q) diffusion, mean diffusivity (MD) and fractional anisotrophy (FA). DSC-pMRI was acquired as described previously. Briefly, a preload dose (0.1 mmol/kg) was administered before acquiring DSC using a Gradient-echo (GE)-EPI (TR/TE/FA=1500 ms/20 ms/60°, matrix=128×128, thickness=5 mm) for 3 minutes. DSC bolus injection (0.05 mmol/kg) commenced at 45 sec during DSC. The initial source volume of images from the GE-EPI after the PLD, an image termed EPI+C, was acquired without dummy scans (prior to magnetization equilibrium), and thus was only sensitive to regional variations in proton density and post-contrast T2*W signal. Assuming similar proton density within tumor voxels, and because the EPI+C signal intensities were acquired at contrast agent equilibrium, EPI+C reflected variations in tissue cellularity (e.g cell density, shape, size, and distribution) as previously described. A leakage correction was performed, and relative cerebral blood volume ("rCBV") was calculated using IB Neuro as previously detailed.

All image datasets were coregistered using ITK (www.itk.org) and IB Suite (Imaging Biometrics) as previously detailed. Briefly, a used rigid-body technique was to co-register image datasets with varying matrix sizes and FOVs to a common matrix/FOV (all data were registered to the DTI series). The additional step of visual validation by expert neuroradiologist review was included to ensure the accuracy of image coregistration, which further reduced potential errors. Previous work quantifying misregistration error suggests minimal impact on the accuracy of spatial correlations.

Texture Analysis, Image Processing, and Principal Component Analysis ("PCA"):

Following image coregistration, all MRI data exhibited uniform voxel size (1.2×1.2×3 mm) across all MRI contrasts (x,y,z dimensions). Regions of interest (ROIs) measuring 8×8×1 voxels (9.6×9.6×3 mm) were then generated at the locations corresponding to each biopsy site. A board-certified neuroradiologist (LH) visually inspected all ROIs to ensure accuracy. Prior to texture analysis, first order statistics from raw image signals were computed, including the mean ("M") and standard deviation ("SD") of gray-level intensities. Next, we mapped intensity values within each ROI onto the range 0-255. This step helped standardize intensities between ROIs and reduced effects of intensity non-uniformity on features extracted during subsequent texture analysis. Next, a texture analysis was performed, incorporating 3 separate but complementary texture algorithms, namely Gray Level Co-Occurrence Matrix ("GLCM"), Local Binary Patterns ("LBP"), and Discrete Orthonormal Stockwell Transform ("DOST"). In total, 30 texture features for each of 8 total MRI contrasts were generated, which yielded 240 MRI-texture features and 16 raw features (i.e., mean and SD for 8 MRI contrasts) for a total of 256 image-based features for each ROI. A PCA was performed to determine Principal components (PCs) for respective MRI-texture algorithms (GLCM, LBP, DOST) for each ROI. The PCs for respective MRI texture features were numbered and correlated individually with genetic status as described.

Statistical Analysis of Imaging-Genetic Correlations:

To broadly survey the potential associations between imaging and genetics, a univariate analysis was first performed comparing each imaging feature at a time against the status of each CNV (aberrant vs diploid/normal). Specifically, a two-sample t-test was used to determine statistically significant differences in image feature values between aberrant and diploid CNV status. The sensitivity analysis a comparison of imaging parameters between aberrant and diploid samples using chi-squared testing with adjustment for clustering of biopsies within patients. Results remained highly consistent with the primary results which did not adjust for clustering. Teh Benjamini & Hochberg (1995) false discovery rate was also to adjust for multiple testing within each texture feature and mutation. Furthermore, to assess whether multiple image features could be used in a complementary fashion to predict CNV status, a multivariate analysis was performed by fitting decision trees based models on the image features. Separate decision tree models were developed for each CNV of interest. When the sample size allowed (i.e., >20% of tissue specimens demonstrated a particular CNV aberration), BAT and ENH tumor samples were separated, and one decision tree was developed for the BAT samples and another decision tree for the ENH samples. However, if separation of BAT and ENH samples resulted in a small sample size (e.g., <20% of tissue samples showing CNV mutation), the ENH and BAT samples were combined to develop a single decision tree. For each decision tree model, an area under the curve (AUC) on receiver operator characteristic (ROC) analysis was computed to determine the accuracy of the training data. Each model's accuracy was subsequently validated in predicting/classifying the CNV status using leave-one-out cross validation ("LOOCV"). LOOCV is a commonly-used approach to evaluate the accuracy of a statistical model on unseen data.

Patient Recruitment and Tissue Samples:

A total of 81 tissue specimens were collected from 18 GBM patients. Of these, 48 tissue specimens (16 BAT, 32 ENH) from 13 patients (median=3 specimens/patient) contained adequate tumoral and/or DNA content for successful aCGH analysis. The majority of biopsies (93.75%) were separated by >1 cm. Three biopsies (6.25%) were separated by 6-10 mm from other biopsies in the same patient. In this study, the regional intratumoral heterogeneity of genetic profiles was evaluated, as documented through multiple stereotactic biopsies within a single tumor. Due to the heterogeneous nature of GBM tumors, and the goals of this study, multiple tissue specimens from the same tumor were considered as independent observations. This approach has been used by previous studies that have used imaging to evaluate intratumoral heterogeneity. Sensitivity analysis using chi-squared testing further supported the minimal impact on correlations when adjusting for clustering of biopsies within patients.

TABLE 5

Selected associations between CNV and imaging on univariate analysis.

| CNV | MRI-texture feature | p-value | Biophysical correlate |
|---|---|---|---|
| EGFR ++ (7p11) | T2W-DOST* | <0.005 | Tissue water/edema |
| | T2W-GLCM* | <0.002 | |
| | T2W raw SD* | <0.004 | |
| | rCBV-LBP* | <0.001 | Microvessel volume; angiogenesis |
| PDGFRA ++ (4q12) | P-DOST* | <0.0001 | Isotropic diffusion; tumor cell density |
| | P-GLCM* | <0.009 | |
| | EPI + C-DOST | <0.014 | Cellular and vascular density |
| PTEN – (10q23) | T2W-LBP | <0.005 | Tissue water/edema |
| CDKN2A – (9p21.3) | EPI + C-LBP | <0.004 | Cellular and vascular density |
| RB1 – (13q14) | T1 + C-GLCM | <0.01 | MRI enhancement; BBB disruption |
| | T2W-DOST | <0.03 | Tissue water/edema |
| | T2W raw SD | <0.008 | |
| TP53 – (17p13) | P-LBP | <0.03 | Isotropic diffusion; tumor cell density |
| | T2W-DOST | <0.02 | Tissue water/edema |

Figure 5:
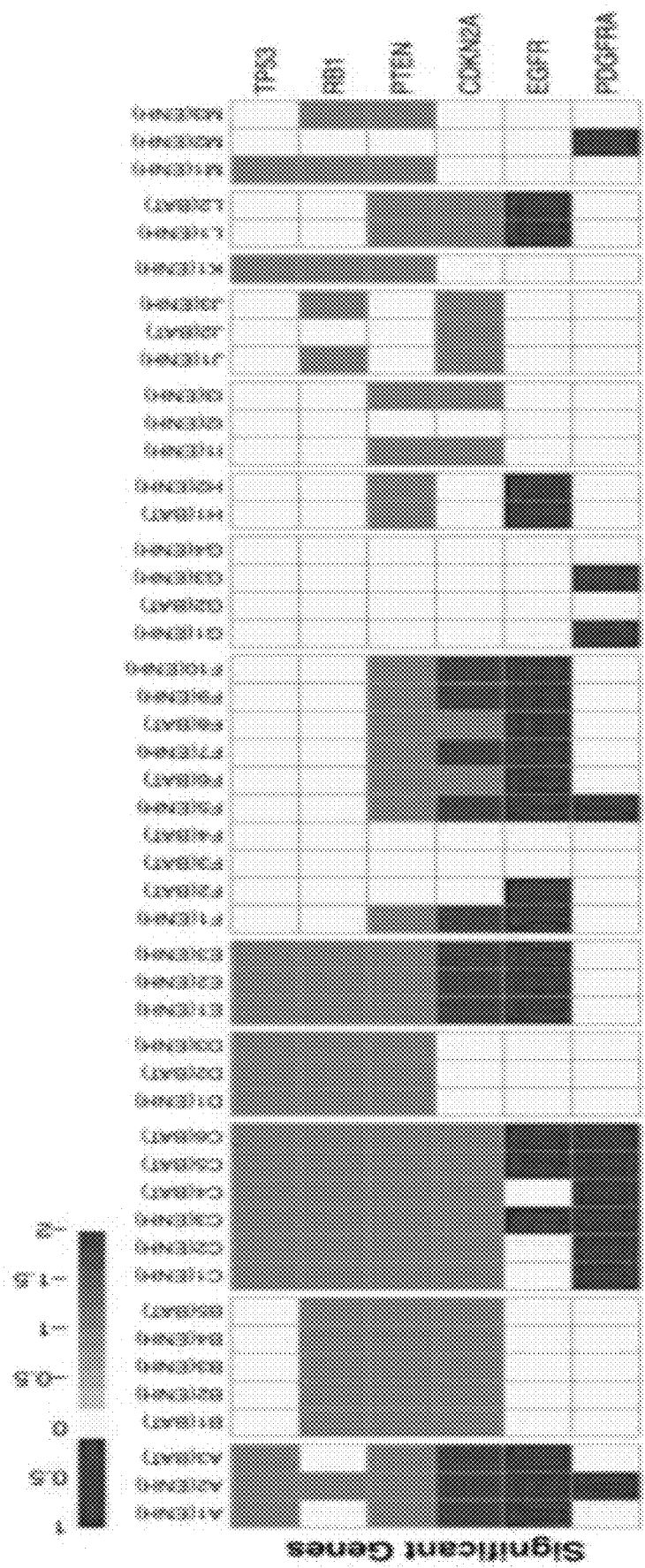
FIG. 5 is a graphical representation showing copy number variant ("CNV") profiles for tumor samples obtained from patients suffering from Glioblastoma ("GBM").

++ denotes amplification;
– denotes deletion;
SD = standard deviation of raw MRI signal;
DOST = Discrete Orthonormal Stockwell Transform;
GLCM = Gray Level Co-Occurrence Matrix;
LBP = Local Binary Product.
*denotes correlations that showed false discovery rate <5% when adjusting for multiple testing CNV Aberrations of Interest:

Of the core GBM pathways reported by TCGA, CNVs associated with six driver genes met inclusion criteria (>20% prevalence) for further imaging genetic analyses (Tables 1, 2). PTEN deletion on 10q23 was the most commonly observed genetic alteration (75% of total samples), followed by CDKN2A deletion on 9p21.3 (64.5%), RB1 deletion on 13q14 (47.9%), EGFR amplification on 7p11 (43.75%), TP53 deletion on 17p13 (35.4%), and PDGFRA amplification on 4q12 (22.9%). Specimens isolated from 7 of 13 GBM tumors demonstrated heterogeneity in genetic profiles, such that at least one of the samples showed different CNV aberration(s) compared to the other samples from the same tumor (FIG. 5). For imaging-genetic correlations, we defined aberrations for PTEN, CDKN2A, RB1, and TP53 as either homozygous or heterozygous deletion.

TABLE 6

Decision tree models for predicting CNV status.

| CNV | Tumor segment | CNV prevalence (%) | Decision Tree AUC | LOOCV accuracy |
|---|---|---|---|---|
| EGFR ++ (7p11) | BAT | 50% (8/16) | 0.94 | 75% |
| | ENH | 40.6% (13/32) | 1.00 | 71.9% |
| PDGFRA ++ (4q12) | BAT/ENH | 22.9% (9/48) | 0.89 | 77.1% |
| PTEN – (10q23) | BAT | 68.8% (11/16) | 0.90 | 68.8% |
| | ENH | 78.1% (25/32) | 1.00 | 43.8% |
| CDKN2A – (9p21.3) | BAT | 62.5% (10/16) | 0.95 | 87.5% |
| | ENH | 65.6% (21/32) | 0.94 | 59.4% |
| RB1 – (13q14) | BAT | 37.5% (6/16) | 0.95 | 87.5% |
| | ENH | 53.1% (17/32) | 1.00 | 43.8% |
| TP53 – (17p13) | BAT | 31.2% (5/16) | 1.00 | 37.5% |
| | ENH | 37.5% (12/32) | 1.00 | 37.5% |

Figure 6:
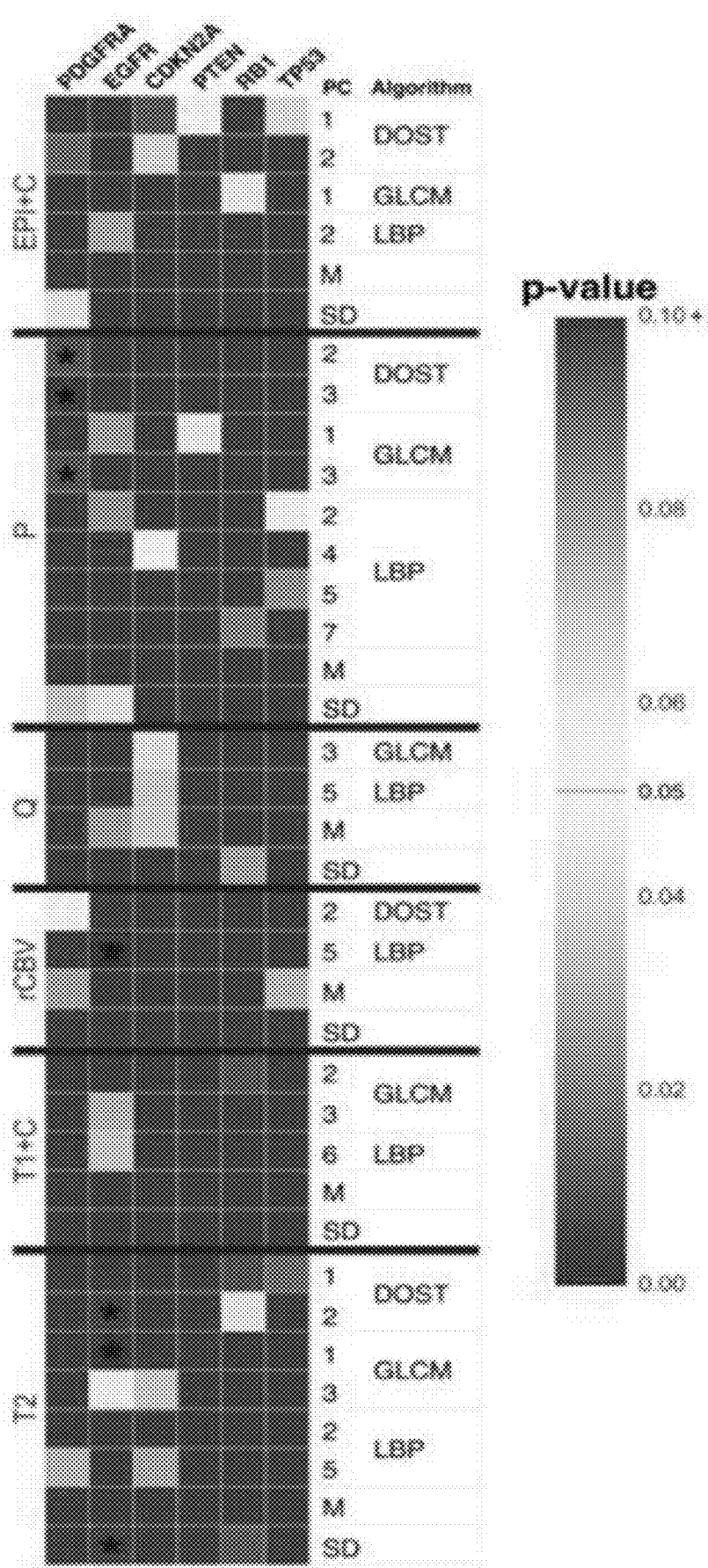
FIG. 6 is heat map showing p-values for significant imaging correlations with CNV status, in accordance with aspects of the present disclosure.

Univariate Analyses of Imaging-Genetic Associations:

The analysis of DTI metrics (p, q, MD, FA) showed that p and q values were equivalent to MD and FA, respectively. For all imaging-genetic correlative studies, we proceeded with the analysis of p and q values and used these to also represent MD and FA, respectively. On univariate analysis, CNV status correlated more strongly with MRI texture features than with raw MRI signal intensities (i.e., mean and standard deviation), suggesting the added value of texture analysis. Table 5 and FIG. 6 summarize the predominant imaging-genetic correlations. EGFR amplification showed highly significant correlations with LBP texture on rCBV maps as well as three separate features on T2W imaging: two texture-based features (on DOST and GLCM) and standard deviation (SD) of raw T2W signal. PDGFRA amplification strongly correlated with DOST and GLCM texture on isotropic diffusion (p). Each of these imaging correlations demonstrated false discovery rates (FDR)<5% (Table 5, FIG. 6). PDGFRA status also moderately correlated with DOST texture on EPI+C. CDKN2A showed highly significant correlation with LBP texture on EPI+C, while PTEN correlated strongly with LBP texture on T2W imaging. RB1 deletion moderately correlated with several imaging features (T2W and T1+C textures, and T2W raw SD), while TP53 deletion showed the weakest imaging correlations compared to all other CNVs.

Multivariate Analysis Through Decision Tree Models and Leave-One-Out Cross Validation ("LOOCV"):

Using multivariate analysis, separate decision tree models were developed for ENH and BAT tumor samples, respectively, for 5 out of 6 CNVs of interest. For PDGFRA, separating BAT and ENH groups resulted in low prevalence for BAT samples (only 18.75% of samples with amplification). Thus, BAT and ENH samples were grouped to develop one decision tree model to predict PDGFRA amplification. Decision tree models for all CNVs achieved high AUC (Table 6) on the training set, ranging from 0.89 to 1.0. The LOOCV accuracies showed variability, depending on the CNV of interest and tumor segment subgroups (BAT vs ENH). Interestingly, four of the six predictive models showed higher LOOCV accuracies for BAT samples compared to ENH samples: EGFR (75% vs 71.9%); RB1 (87.5% vs 43.8%); CDKN2A (87.5% vs 59.4%); PTEN (68.8% vs 43.8%). The PDGFRA predictive model showed high accuracy (77.1%) in combined BAT/ENH samples. Low LOOCV accuracies were noted in both BAT and ENH samples for TP53 (37.5% and 37.5%). These LOOCV accuracies are also summarized in Table 6 A total of 11 tree models were produced. All together these included 25 decision nodes. DOST-based texture features were selected most frequently for tree model construction (10 of 25 decision nodes), followed by: LBP features (7 of 25); GLCM features (7 of 25); and raw features (1 of 25).

Previous studies have documented GBM's intratumoral genetic heterogeneity by karyotype, DNA aneuploidy, gene expression profiling, and more recently copy number analysis and next generation sequencing. This heterogeneity—which is thought to arise from clonal expansion of multiple genetically divergent tumor populations—has implications for targeted therapy and tumoral resistance. Each clonal population can express different drug targets and sensitivities, which promotes the likelihood that pre-existing resistant clones will fail a given therapy and subsequently recur. Neighboring clonal populations can further modulate therapeutic response through biological interactions. These issues have motivated recent efforts to develop combinatorial strategies that can overcome and even exploit genetic heterogeneity for therapeutic benefit. And as genetically informed paradigms become more segment (ENH), MRI enhancement alone lacks the specificity to resolve the regional and genetically distinct clonal populations throughout each tumor. Numerous correlative studies have evaluated other imaging features as potential biomarkers of genetic status. Yet, most have used non-localizing biopsies (typically from a small representative subregion) to determine a single genetic profile for an entire tumor. Unfortunately, this fails to inform of intratumoral heterogeneity as a whole, since the genetic profiles from one biopsy location may not accurately reflect those from other tumor subregions.

In fact, sampling errors can potentially degrade imaging-tissue correlations. Gutman et al. and Jain et al. separately reported the absence of imaging correlations with common putative GBM drivers (e.g., EGFR, PDGFRA, PTEN, CDKN2A), which typically show regional heterogeneity throughout each tumor. Other studies have reported mixed correlations between whole-tumor imaging and GBM subtypes, although these have not accounted for the fact that multiple subtypes can co-exist within a single tumor. Meanwhile, different groups using non-localizing biopsies have shown conflicting results on whether EGFR correlates with perfusion MRI metrics.

In this study, multiple image-guided biopsies were collected from both ENH and BAT tumor segments to demonstrate intratumoral heterogeneity for core GBM pathways and common therapeutic targets. Although previous studies have shown how tumor samples from nonenhancing BAT can genetically differ from ENH samples, data obtained in this study illustrates that regional genetic diversity can also exist within each tumor segment. This underscores the need to improve the image-based characterization of genetic heterogeneity, beyond the use of CE-MRI enhancement alone. While other studies have also used image-guided biopsies, the present study has taken several unique approaches to facilitate the image-based characterization of regional genetic status, including 1) integration of multiple, complementary MRI contrasts; 2) use of multiple, complimentary texture algorithms to probe tissue microstructure; and 3) development of predictive models for specific GBM driver genes. These aspects have enabled the identification of multiple, statistically significant associations between localized imaging features and regional CNV status, summarized in Table 5 and FIG. 6

From the univariate analysis performed, strong correlation between regional EGFR status and LBP texture on rCBV were observed. While mean rCBV quantifies the overall average microvessel volume within a region of interest ("ROI"), rCBV texture captures the contributions and signal patterns of the individual voxels within that ROI, giving insight to microvascular distribution and heterogeneity. Previous studies have investigated the link between EGFR and mean rCBV, albeit without localizing biopsies or texture analysis, which may explain conflicting results. Tykocinski et al and Gupta et al. both found correlations between EGFR and raw mean rCBV, while Ryoo et al. and Jain et al. did not. Although sampling error could have contributed to discordance between studies, stereotactic biopsies were used to address this confound and identified no significant correlation between EGFR and raw mean rCBV. However, the finding that texture of rCBV correlates with EGFR status suggests the benefit of characterizing the regional and intervoxel signal patterns for a particular MRI contrast. EGFR also correlated strongly with T2W texture (on DOST and GLCM) as well as T2W intervoxel heterogeneity, as measured by standard deviation of raw signal. The link between EGFR and T2W signal patterns of tumoral/vasogenic edema has been suggested previously. The other CNVs also demonstrated strong correlations with image texture and MRI-based biophysical correlates. PDGFRA strongly associated with textures (but not raw mean values) on isotropic diffusion (P-DOST, P-GLCM) and EPI+C measures of cellular density (EPI+C-DOST). Both MRI contrasts have been linked to tumor cell density and proliferation in previous studies. Similarly, PTEN and CDKN2A correlated highly with textures on T2W (T2W-LBP) and EPI+C (EPI+C-LBP), respectively.

Figure 7B:
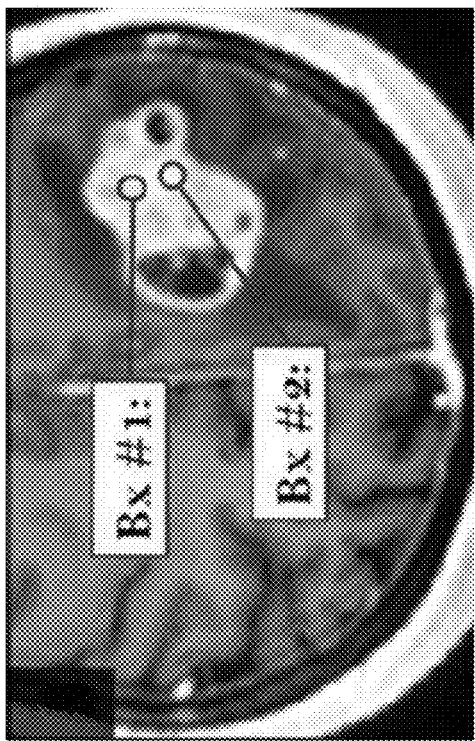
FIG. 7B is an image showing the locations of two example stereotactic brain biopsies on contrast enhanced magnetic resonance imaging ("CE-MRI").
Figure 7C:
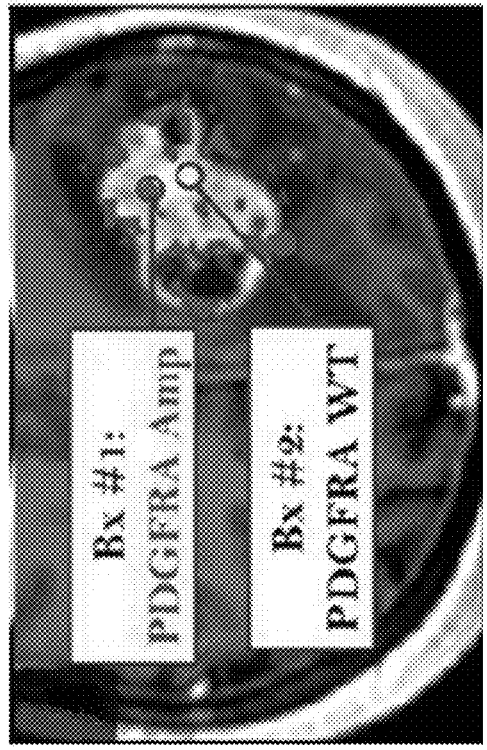
FIG. 7C is an example image having a color map overlaid showing regions of predicted PDGFRA amplification obtained using a tree model classification, in accordance with aspects of the present disclosure.
Figure 7A:
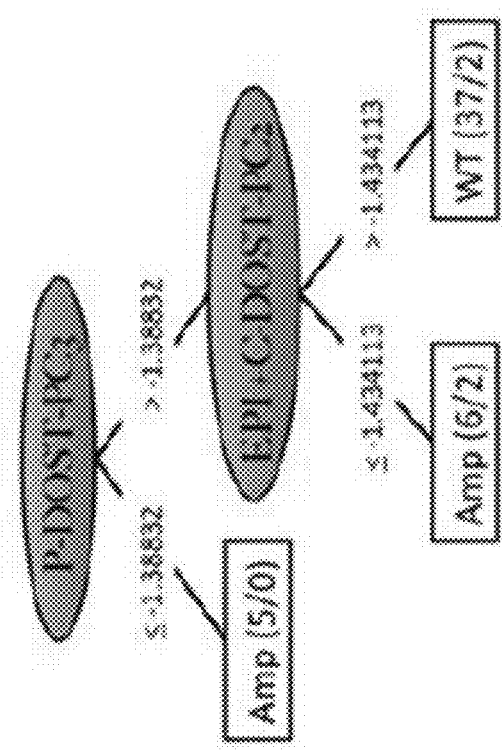
FIG. 7A is an example tree model classification for PDGFRA amplification developed through multivariate analysis of CNV status, multi-parametric MRI and texture analysis, in accordance with aspects of the present disclosure.

The multivariate analysis was used through decision tree modeling to determine whether MRI-based features, either alone or in combination, could predict CNV status for a given biopsy sample. While all training models achieved high AUC on ROC analysis, cross validation showed that only some models retained high accuracy on LOOCV. For example, the model for PDGFRA status (FIG. 7A) demonstrated high LOOCV accuracy (77.1%), while model accuracies for TP53 were low for both BAT and ENH samples. Interestingly, four of the six models showed noticeably higher LOOCV accuracy for BAT samples compared to ENH samples: EGFR (75% vs 71.9%); RB1 (87.5% vs 43.8%); CDKN2A (87.5% vs 59.4%); PTEN (68.8% vs 43.8%). These discrepancies likely relate to multiple underlying factors that warrant further investigation in larger GBM cohorts. One possibility is the influence of driver gene coexpression (e.g., EGFR and PTEN) on image-based phenotypes. Ryoo et al found that tumors co-expressing EGFR amplification and PTEN deletion had significantly lower rCBV values compared to tumors with EGFR amplification alone (and normal PTEN status). Presumably, coexpression of other driver gene combinations could impact a diversity of imaging phenotypes.

Future analysis of molecular markers other than DNA gains/losses (e.g., epigenetic modulation, mRNA and proteomic expression) may also help validate or enhance the correlations in this study. Finally, further work is needed to evaluate how the image-based characterization of intratumoral heterogeneity might impact clinical decisions about GBM therapy and correlative studies by cooperative initiatives like TCGA and The Cancer Imaging Atlas (TCIA). For instance, quantifying the fraction of tumor populations harboring specific gene alterations could be useful for serially tracking treatment efficacy over time, to evaluate how specific tumor regions respond to targeted therapies. This could prove beneficial for proposed strategies such as adaptive therapy, which modulates the selective advantage of the different clonal populations within each tumor to maximize therapeutic benefit. Also, the use of imaging to quantify genetic heterogeneity is likely to enable future comparisons between genetically heterogeneous and homogeneous tumors, in regards to differential responses to standard therapy, clinical outcomes, and development of optimal drug regimens to extend survival.

It is recognized that this exploratory study included a small sample size, and so the tree model accuracies and univariate analyses might need to be prospectively validated in a larger GBM cohort. This might also increase the likelihood of capturing a more diverse set of GBM driver gene alterations (e.g., c-MET, CDK4, etc.), which were otherwise too infrequent in this study to adequately characterize by imaging. Prospective validation might also provide the opportunity to integrate these predictive models with surgical neuronavigation, which can facilitate biopsy targeting of genetically diverse regions within each tumor.

It is also recognized that image distortions and brain shift following craniotomy could lead to misregistration errors. To compensate, neurosurgeons used small craniotomy sizes to minimize brain shift and also visually validated stereotactic image location with intracranial neuroanatomic landmarks to help correct for random brain shifts. Rigid-body coregistration of stereotactic and DSC-MR imaging also helped reduce possible geometric distortions. Overall, experience herein suggests combined misregistration at approximately 1-2 mm from both brain shift and registration technique, which is similar to that from previous studies by using stereotactic needle biopsy. Also, for each patient, multiple tissue samples were collected from spatially distinct subregions within the same tumor. The vast majority of biopsy targets were separated by >1 cm. While ~6-7% of samples (3 out of 48) were separated by 6-10 mm, small ROI sizes were used to minimize the effects of potential sample overlap. A negligible impact from this minority of samples is estimated.

This exploratory study uses image-guided biopsies, multi-parametric MRI, and texture analysis to establish spatially accurate correlations with regional genetic status for a focused set of common GBM drivers. The results here offer proof of concept that image-based biomarkers can facilitate the characterization of intratumoral genetic heterogeneity. This also provides a framework for future studies to validate these and other correlations and to identify image-based signatures for a broader array of biologically and therapeutically significant genetic alterations in GBM.

The present invention has been described in terms of one or more preferred embodiments, and it should be appreciated that many equivalents, alternatives, variations, and modifications, aside from those expressly stated, are possible and within the scope of the invention.

The invention claimed is:

1. A computer-implemented method for characterizing tissues of a subject using multi-parametric imaging, the method comprising:
    receiving, by a computing device including a processor programmed to execute software instructions within a memory, a set of multi-parametric magnetic resonance ("MR") images acquired from a subject using an MR imaging system coupled to the computing device;
    selecting, by the computing device, at least one region of interest ("ROI") in the subject using one or more images in the set of multi-parametric MR images, wherein the set of multi-parametric MR images includes images that separately depict at least two or more different parameters;
    performing, by the computing device, a texture analysis on corresponding ROIs in the set of multi-parametric MR images and performing at least one complementary texture analysis on the ROIs;
    combining, by the computing device, the texture analysis and the at least one complementary texture analysis to generate a set of texture features;
    applying a machine learning algorithm to generate a classification model used in a classification scheme, wherein the machine learning algorithm has been trained using biopsy samples collected from biopsy locations and using multi-parametric MRI data acquired from and co-registered with the biopsy locations;
    applying, by the computing device, the classification scheme, using the set of texture features, to characterize tissues in the ROI, wherein the classification scheme individually operates on each of a plurality of voxels in the ROI in order to assign a tissue type to each of the plurality of voxels within the ROI; and
    generating, by the computing device, a report indicative of characterized tissues in the ROI.

2. The method of claim 1, wherein the set of multi-parametric MR images includes at least two or more of a T1-weighted image, a T2-weighted image, a diffusion tensor image, a dynamic susceptibility image, a perfusion image, or combinations thereof.

3. The method of claim 1, wherein the method further comprises performing an image registration on corresponding images in the set of multi-parametric MR images.

4. The method of claim 1, wherein the method further comprises normalizing images in the set of multi-parametric MR images such that intensities extend over a predetermined dynamic range.

5. The method of claim 1, wherein the method further comprises performing the texture analysis using at least one texture algorithm.

6. The method of claim 1, wherein the at least one texture algorithm is selected from a list comprising a Gray Level Co-Occurrence Matrix ("GLCM") algorithm, a Local Binary Patterns ("LBP") algorithm, a Discrete Orthonormal Stockwell Transform ("DOST"), a Gabor Filter Banks ("GFB"), a Laplacian of Gaussian Histogram ("LGH").

7. The method of claim 1, wherein the method further comprises reducing a dimensionality of the set of texture features using a Principle Component Analysis ("PCA").

8. The method of claim 1, wherein the machine learning algorithm includes applying a Diagonal Linear Discriminate Analysis ("DLDA"), a Diagonal Quadratic Discriminate Analysis ("DQDA"), or a Support Vector Machines ("SVM") algorithm.

9. The method of claim 1, wherein the report comprises at least one image indicating different tissue types in the subject.

10. The method of claim 1, wherein the method further comprises determining at least one biopsy location based on characterized tissues in the ROI.

11. The method of claim 1, wherein the method further comprises determining a genetic heterogeneity in the ROI based on characterized tissues.

12. The method of claim 1, wherein the method further comprises adapting a treatment based on characterized tissues in the ROI.

13. A system for characterizing tissues of a subject using multi-parametric imaging, the system comprising:
    an input configured to receive a set of multi-parametric magnetic resonance ("MR") images, wherein the set of multi-parametric MR images includes images that separately depict at least two or more different parameters;
    a processor programmed to:
        select at least one region of interest ("ROI") in the subject using one or more images in the set of multi-parametric MR images;
        perform a texture analysis on corresponding ROIs in the set of multi-parametric MR images and perform at least one complementary texture analysis on the ROIs;
        combine the texture analysis and the at least one complementary texture analysis to generate a set of texture features;
        apply a machine learning algorithm to generate a classification model used in a classification scheme, wherein the machine learning algorithm has been trained using biopsy samples collected from biopsy locations and using multi-parametric MRI data acquired from and co-registered with the biopsy locations;

apply the classification scheme, using the set of texture features, to characterize tissues in the ROI, wherein the classification scheme individually operates on each of a plurality of voxels in the ROI in order to assign a tissue type to each of the plurality of voxels within the ROI;

generate a report indicative of characterized tissues in the ROI; and an output for displaying the report.

14. The system of claim 13, wherein the set of multi-parametric MR images includes at least two or more of a T1-weighted image, a T2-weighted image, a diffusion tensor image, a dynamic susceptibility image, a perfusion image, or combinations thereof.

15. The system of claim 13, wherein the processor is further programmed to perform an image registration on corresponding images in the set of multi-parametric MR images.

16. The system of claim 13, wherein the processor is further programmed to normalize images in the set of multi-parametric MR images such that intensities extend over a predetermined dynamic range.

17. The system of claim 13, wherein the processor is further programmed to perform the texture analysis by applying a Gray Level Co-Occurrence Matrix ("GLCM") algorithm, a Local Binary Patterns ("LBP") algorithm, a Discrete Orthonormal Stockwell Transform ("DOST"), a Gabor Filter Banks ("GFB"), a Laplacian of Gaussian Histogram ("LGH"), or a combination thereof.

18. The system of claim 13, wherein the processor is further programmed to reduce a dimensionality of the set of texture features using a Principle Component Analysis ("PCA").

19. The system of claim 13, wherein the report comprises at least one image indicating different tissue types in the subject.

20. The system of claim 13, wherein the processor is further programmed to determine at least one biopsy location based on characterized tissues in the ROI.

21. The system of claim 13, wherein the processor is further programmed to determine a genetic heterogeneity in the ROI based on characterized tissues.

* * * * *